United States Patent [19]
Chang

[11] Patent Number: 5,332,563
[45] Date of Patent: *Jul. 26, 1994

[54] YELLOW PHOSPHORUS PROCESS TO CONVERT TOXIC CHEMICALS TO NON-TOXIC PRODUCTS

[75] Inventor: Shih-Ger Chang, El Cerrito, Calif.

[73] Assignee: The Regents of the University of California, Oakland, Calif.

[*] Notice: The portion of the term of this patent subsequent to Apr. 21, 2009 has been disclaimed.

[21] Appl. No.: 819,758

[22] Filed: Jan. 13, 1992

Related U.S. Application Data

[63] Continuation-in-part of Ser. No. 518,722, May 4, 1990, Pat. No. 5,106,601, and a continuation-in-part of Ser. No. 261,229, Oct. 24, 1988, Pat. No. 5,164,167.

[51] Int. Cl.$^5$ .................. B01J 8/00; C10H 23/00; C01C 3/00; C01B 25/16
[52] U.S. Cl. ................ 423/245.1; 423/236; 423/243.03; 423/245.2; 423/318; 423/581; 210/760
[58] Field of Search ............... 423/235, 235 D, 245.2, 423/318, 236, 581, 245.1, 243.03; 210/760

[56] References Cited

U.S. PATENT DOCUMENTS 5,106,601 4/1992 Chang et al. .................. 423/235
5,164,167 11/1992 Chang et al. .................. 423/235

Primary Examiner—Gregory A. Heller
Attorney, Agent, or Firm—Phillips, Moore, Lempio & Finley

[57] ABSTRACT

The present invention relates to a process for generating reactive species for destroying toxic chemicals. This process first contacts air or oxygen with aqueous emulsions of molten yellow phosphorus. This contact results in rapid production of abundant reactive species such as O, $O_3$, PO, $PO_2$, etc. A gaseous or liquid aqueous solution organic or inorganic chemicals is next contacted by these reactive species to reduce the concentration of toxic chemical and result in a non-toxic product. The final oxidation product of yellow phosphorus is phosphoric acid of a quality which can be recovered for commercial use. A process is developed such that the byproduct, phosphoric acid, is obtained without contamination of toxic species in liquids treated. A gas stream containing ozone without contamination of phosphorus containing species is also obtained in a simple and cost-effective manner. This process is demonstrated to be effective for destroying many types of toxic organic, or inorganic, compounds, including polychlorinated biphenyls (PCB), aromatic chlorides, amines, alcohols, acids, nitro aromatics, aliphatic chlorides, polynuclear aromatic compounds (PAH), dyes, pesticides, sulfides, hydroxyamines, ureas, dithionates and the like.

28 Claims, 16 Drawing Sheets

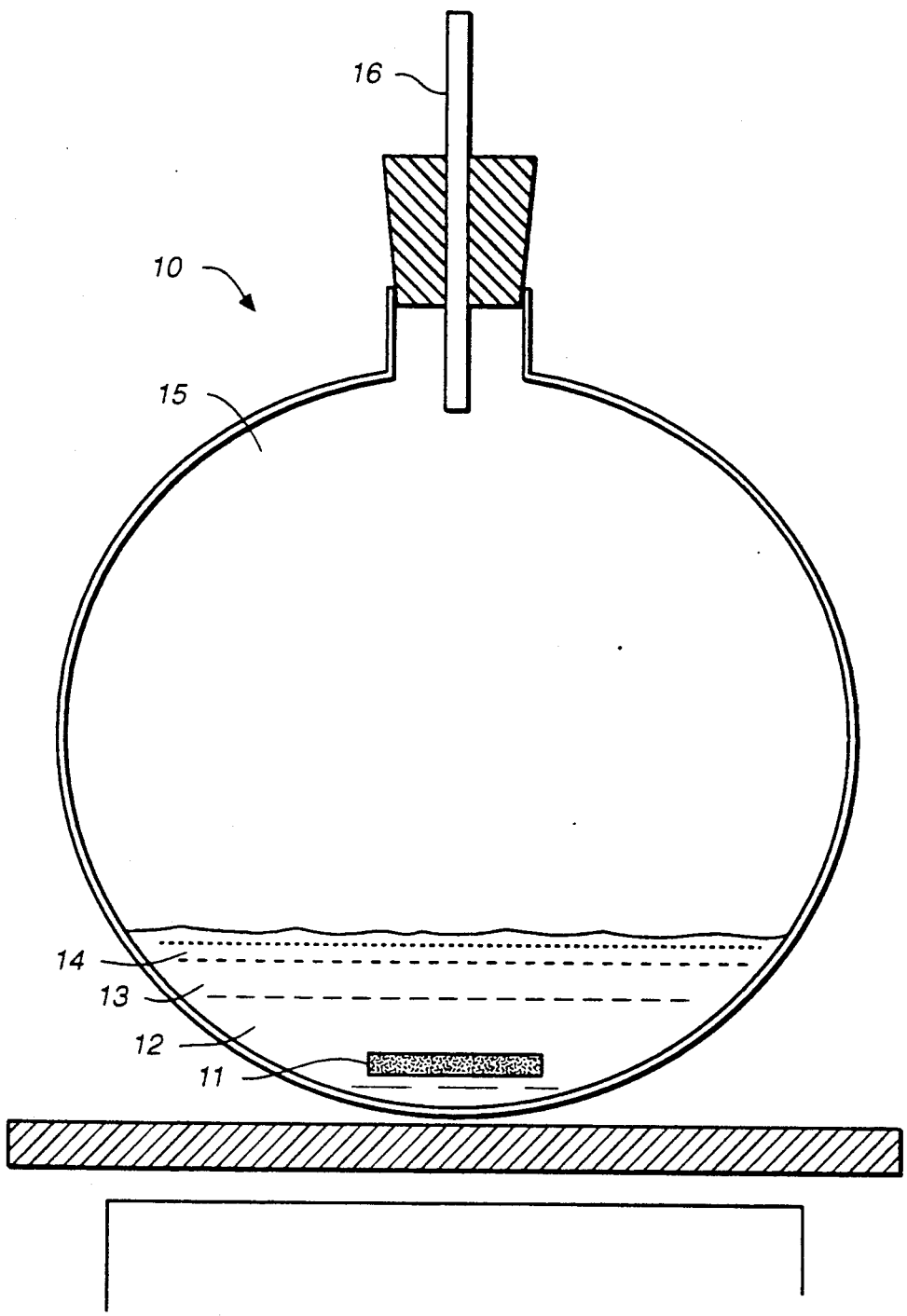
FIG._1

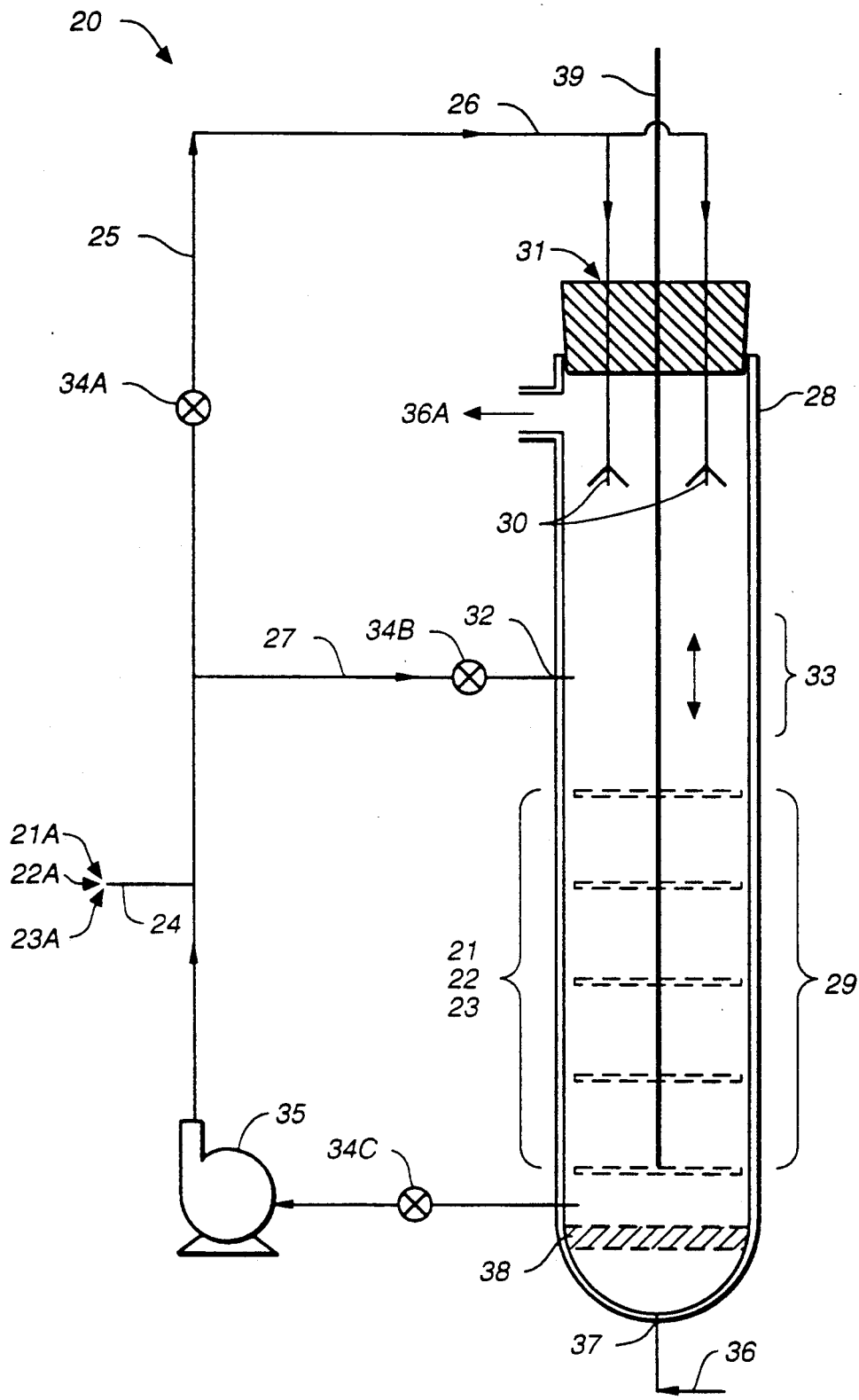
FIG._2

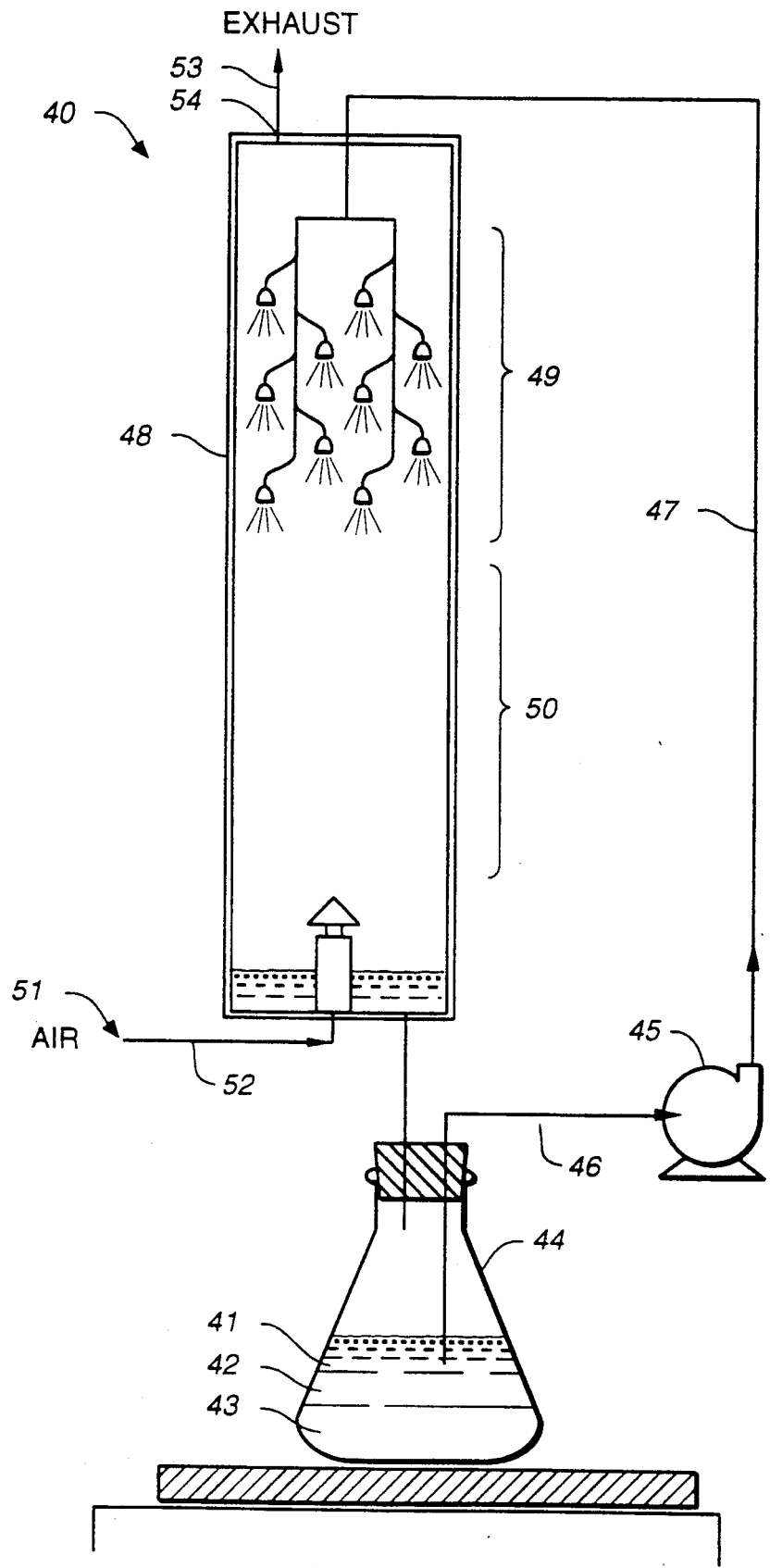
FIG._3

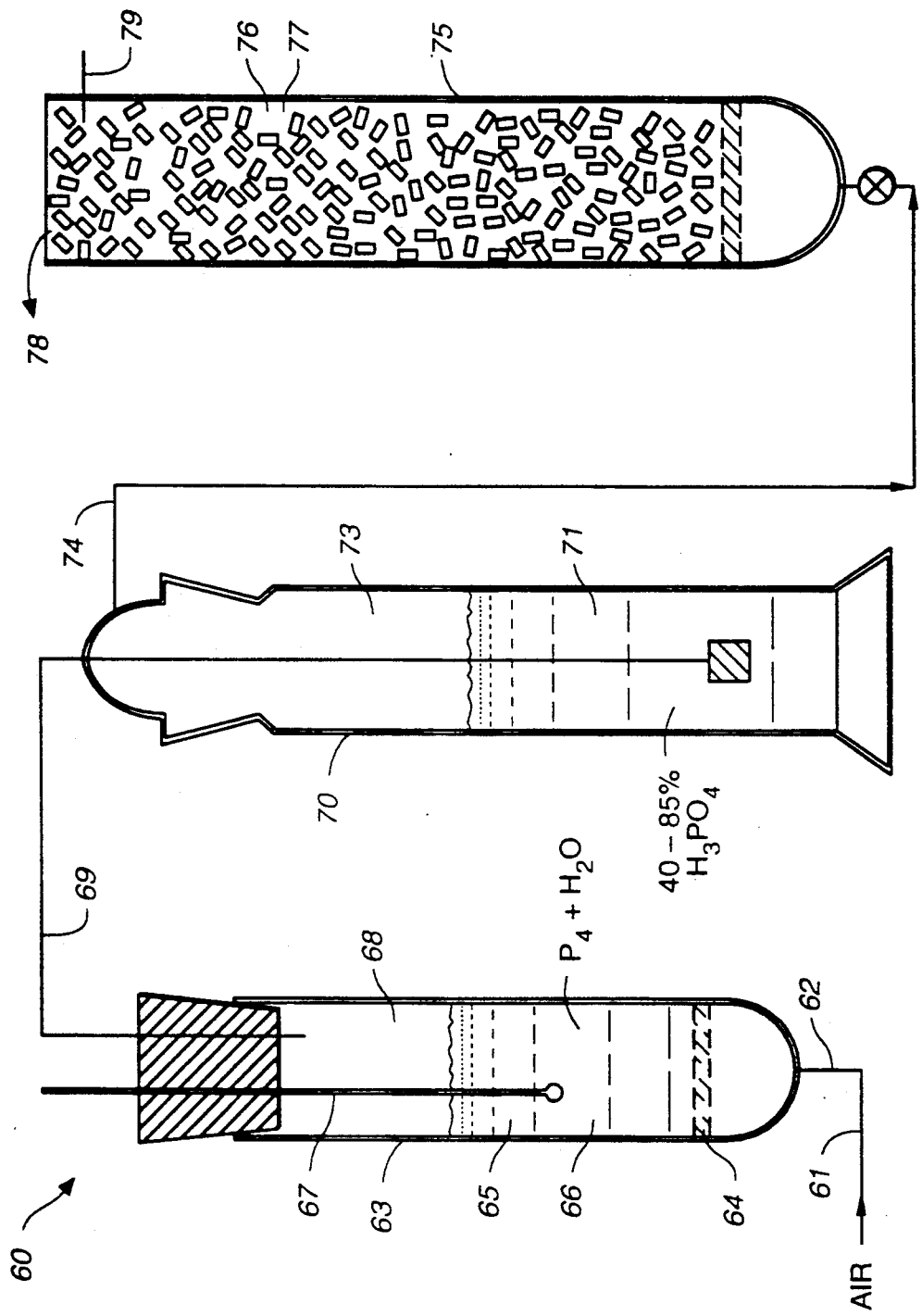
FIG._4

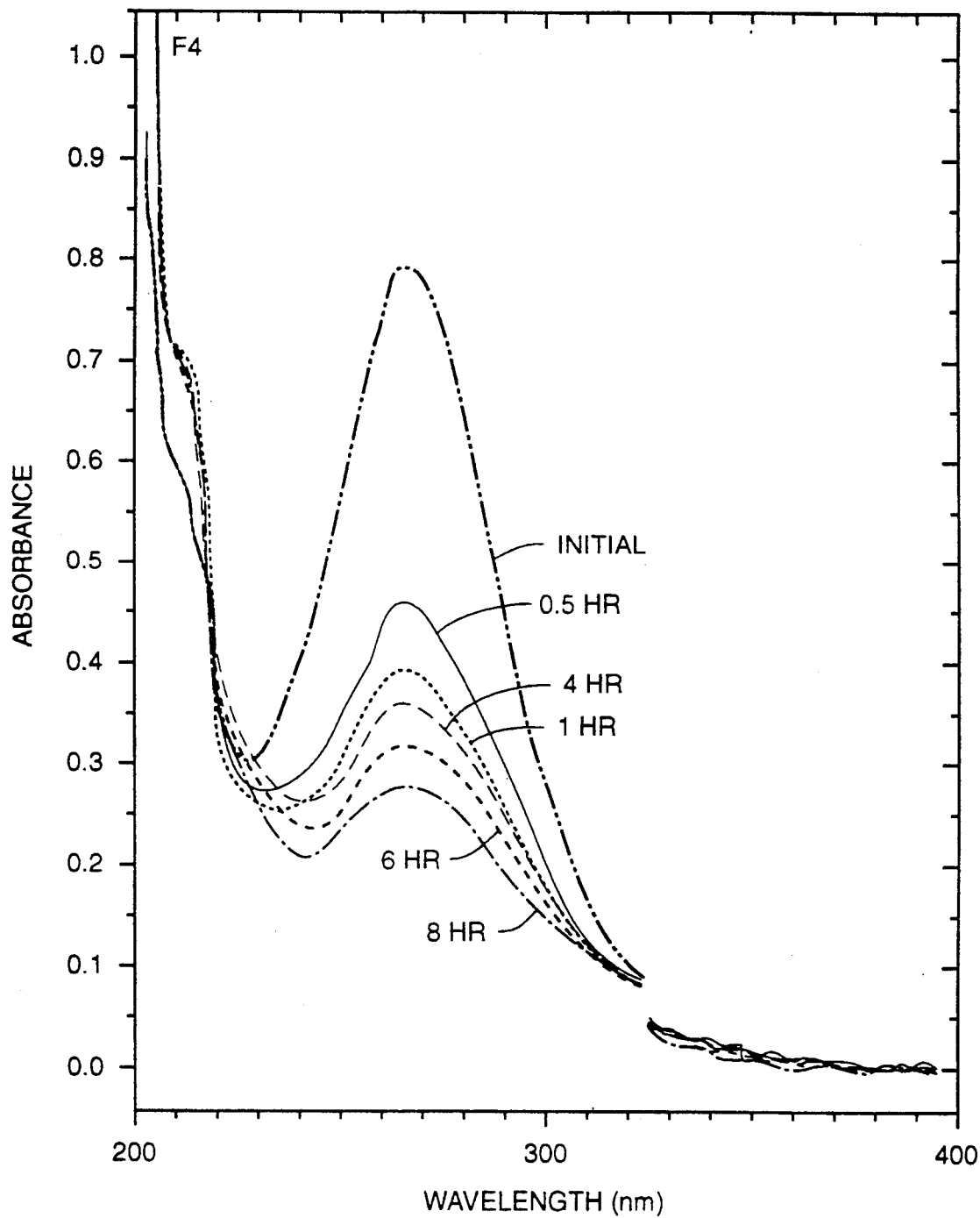
FIG._5

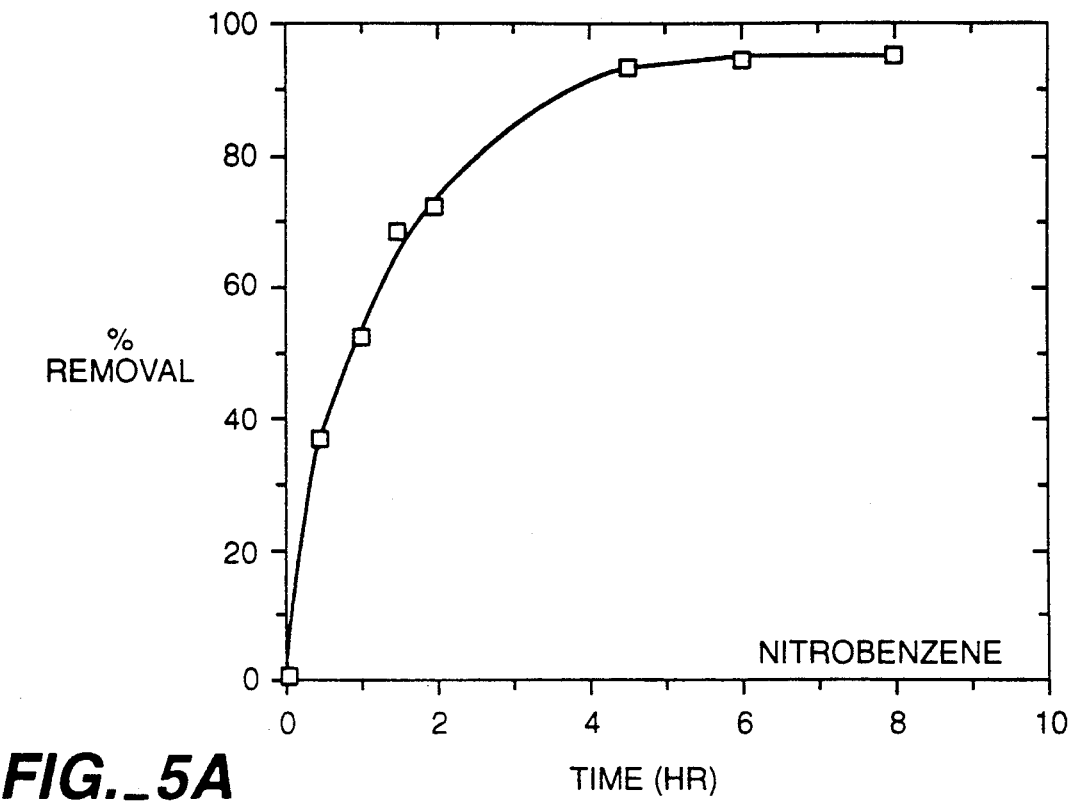
FIG._5A
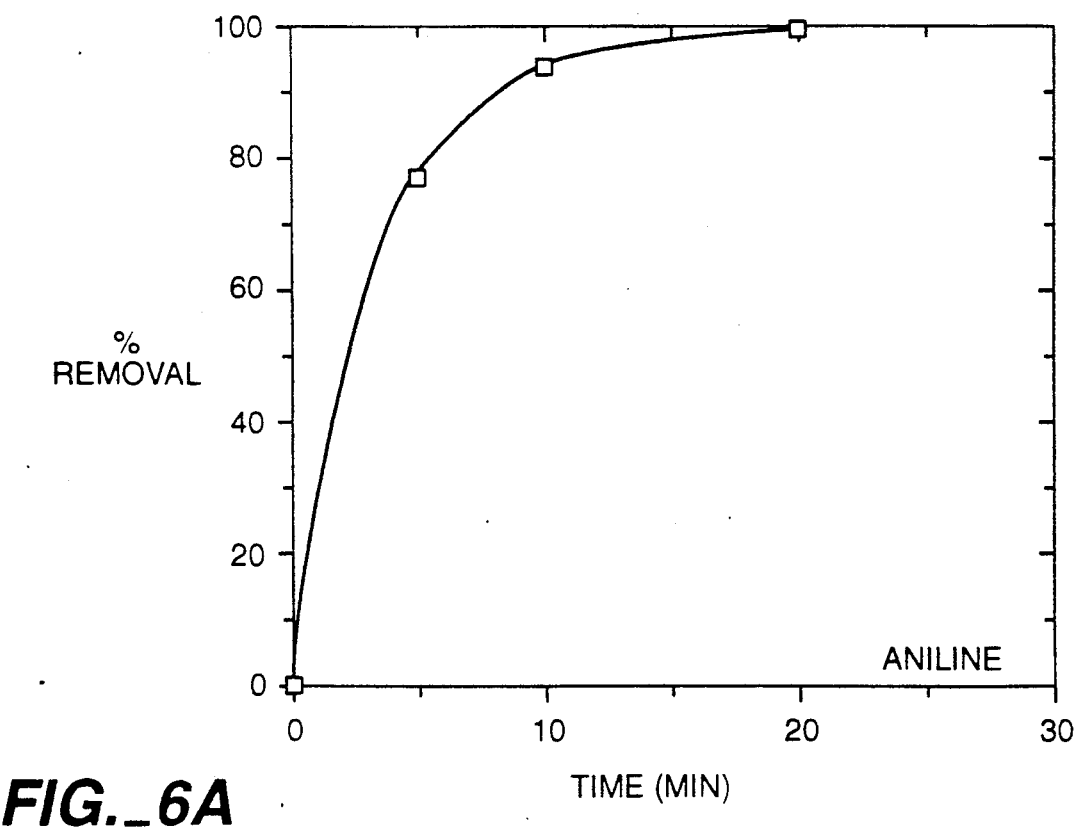
FIG._6A

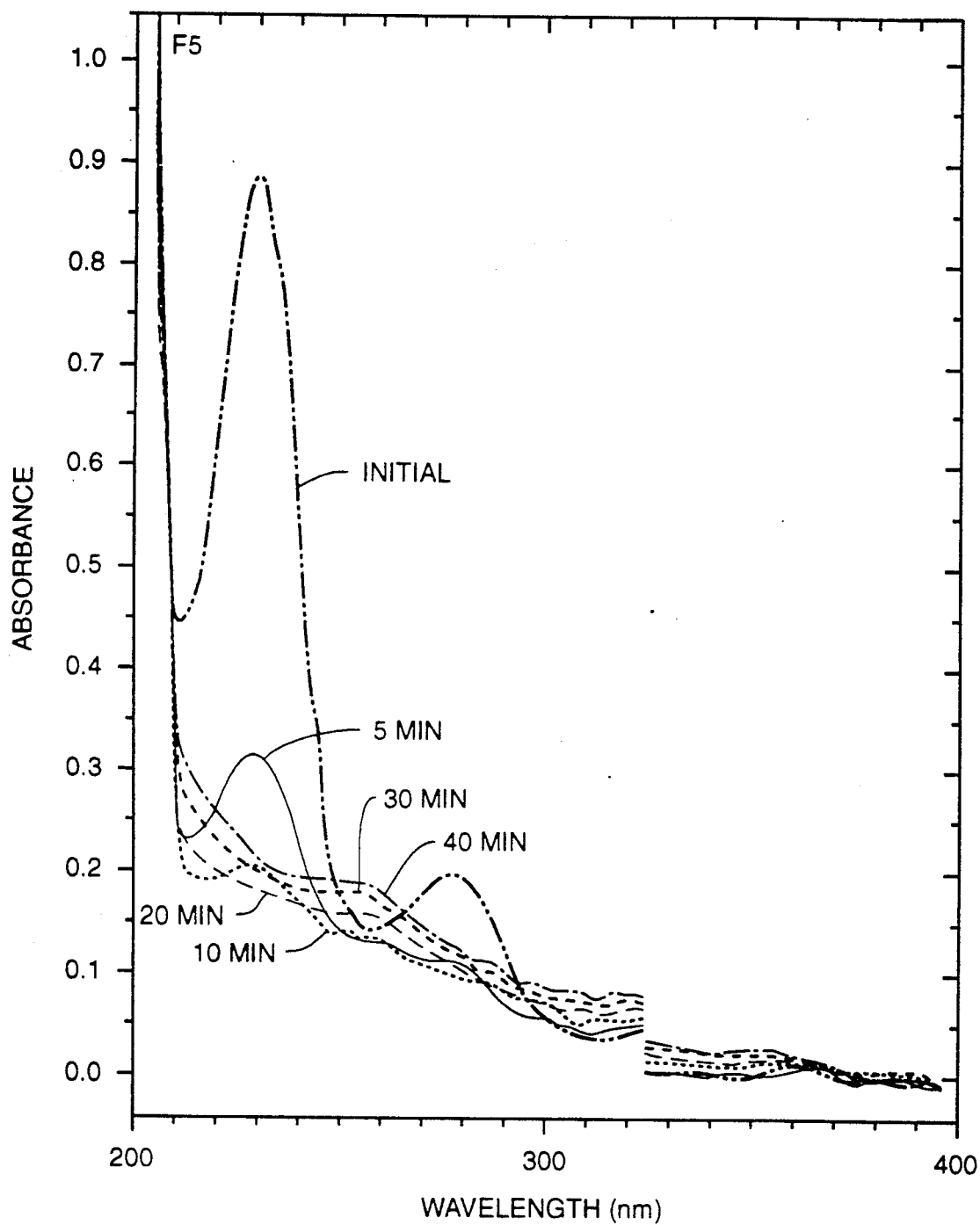
FIG._6

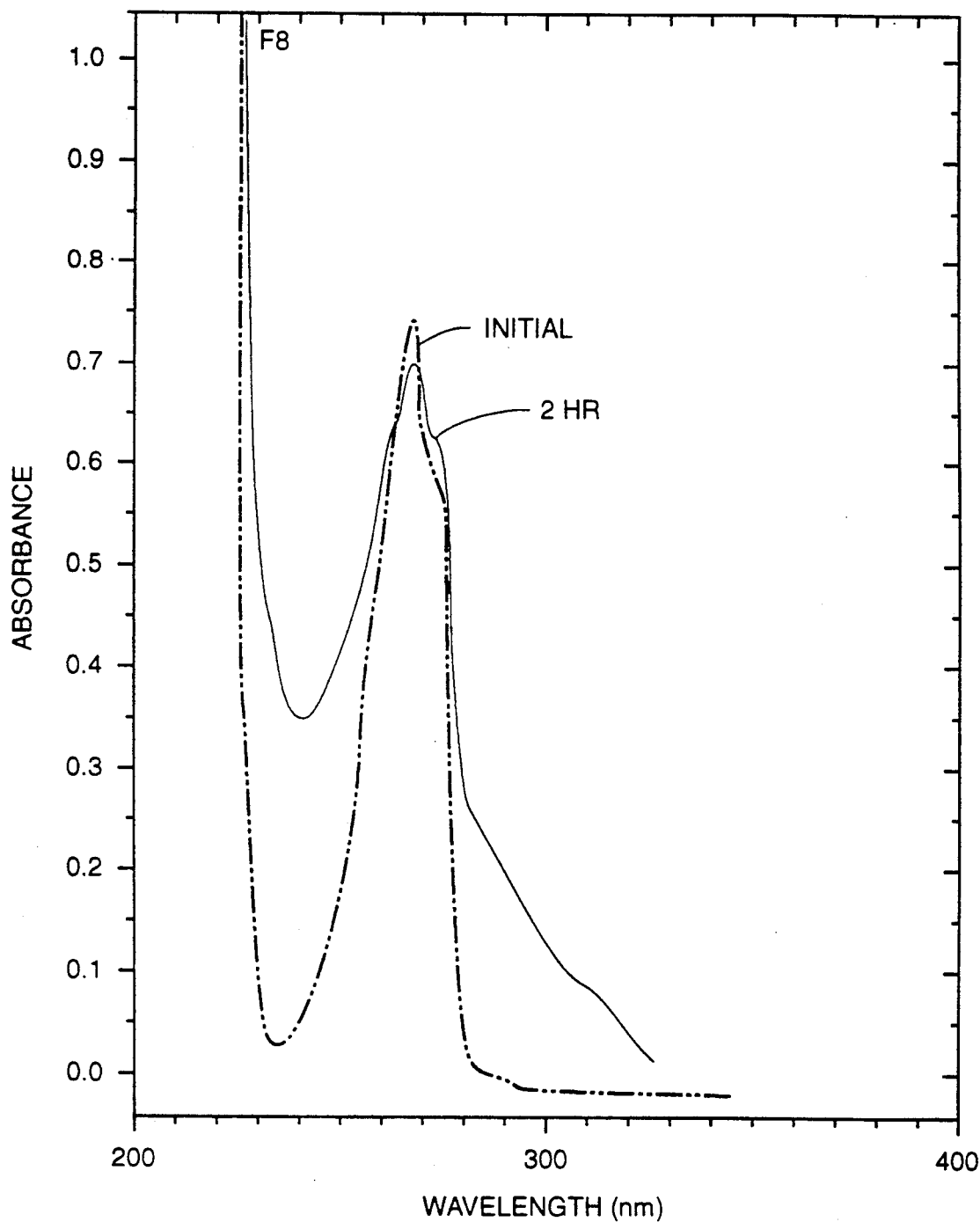
FIG._7

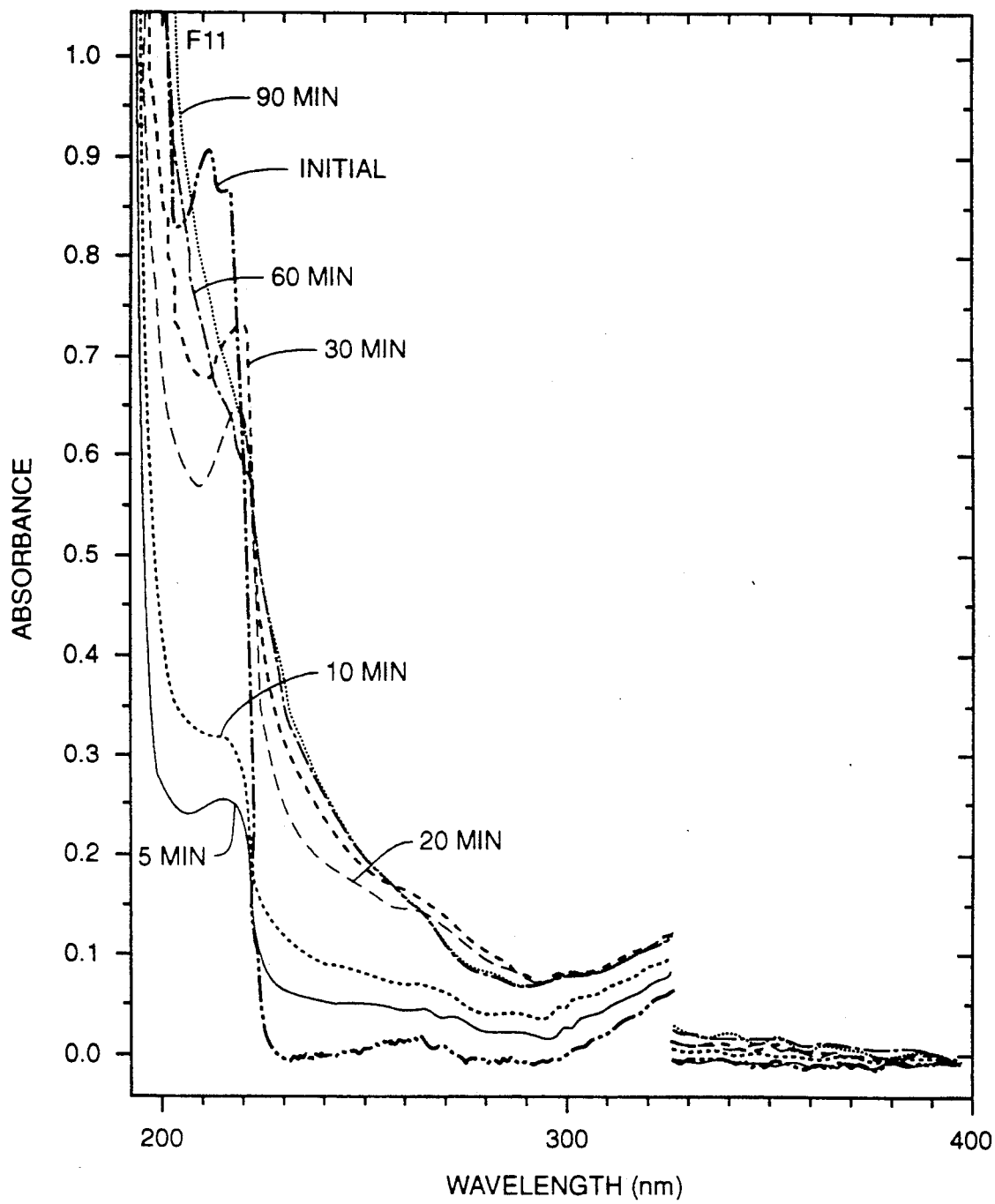
FIG._8

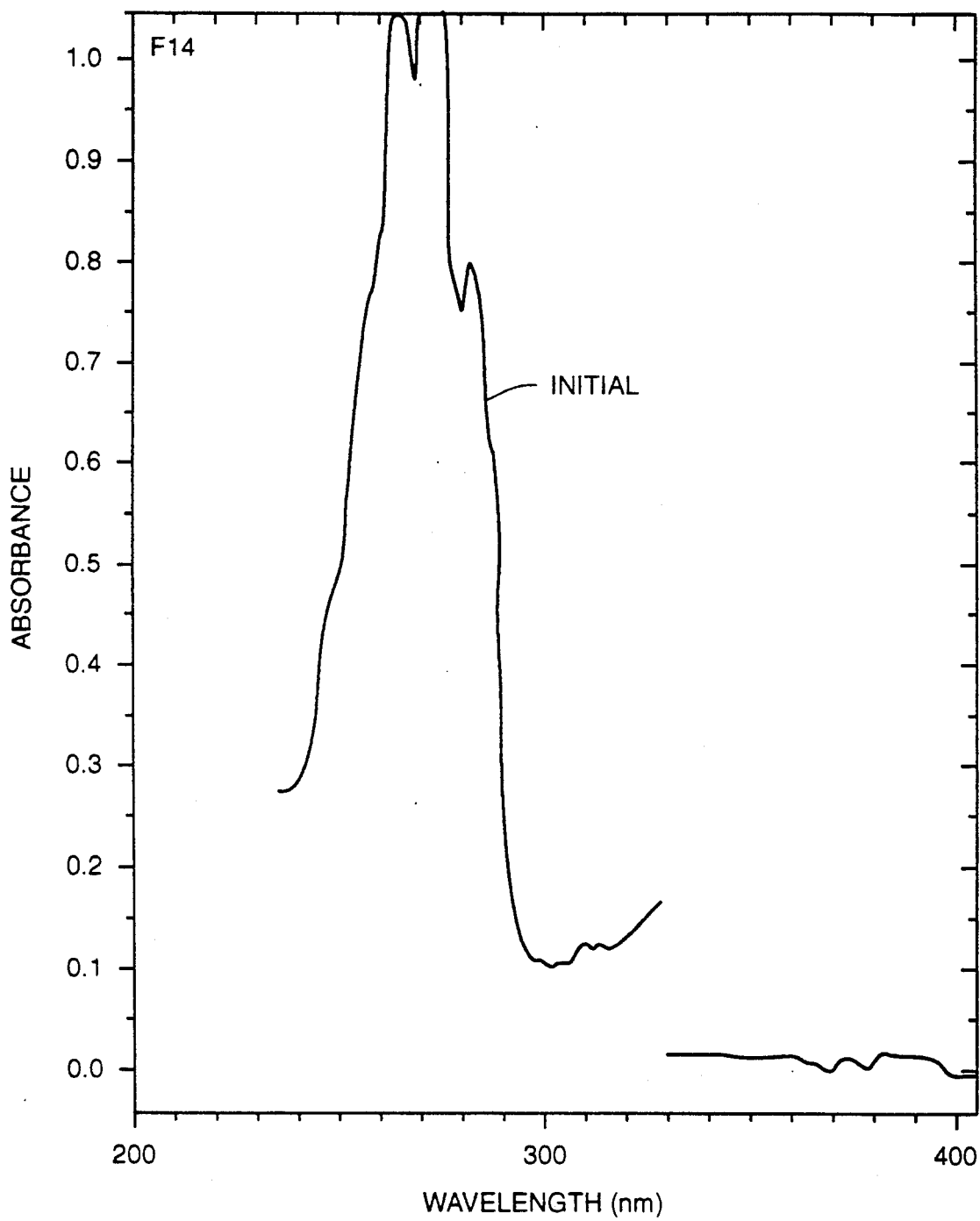
FIG._9

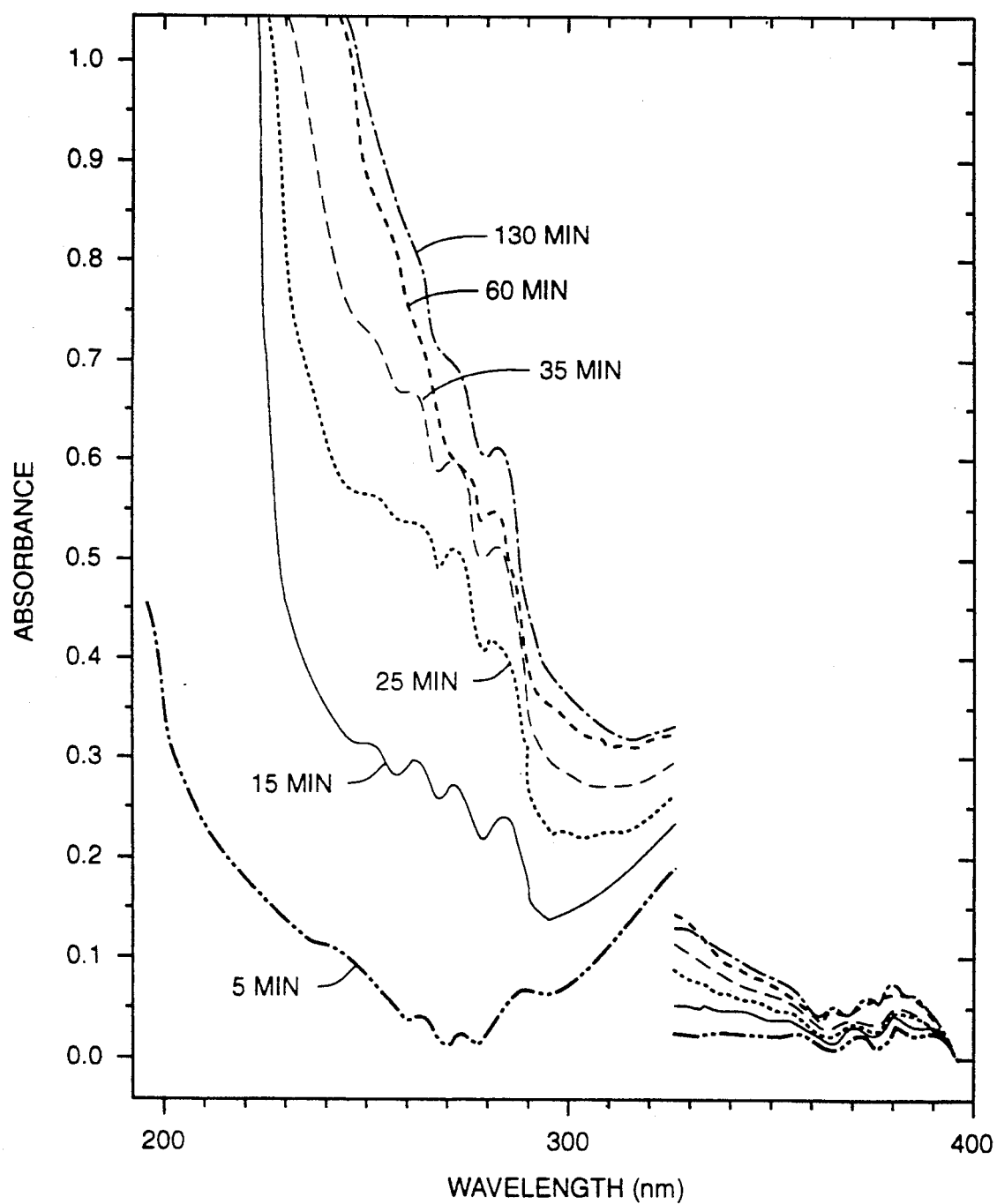
FIG._9A

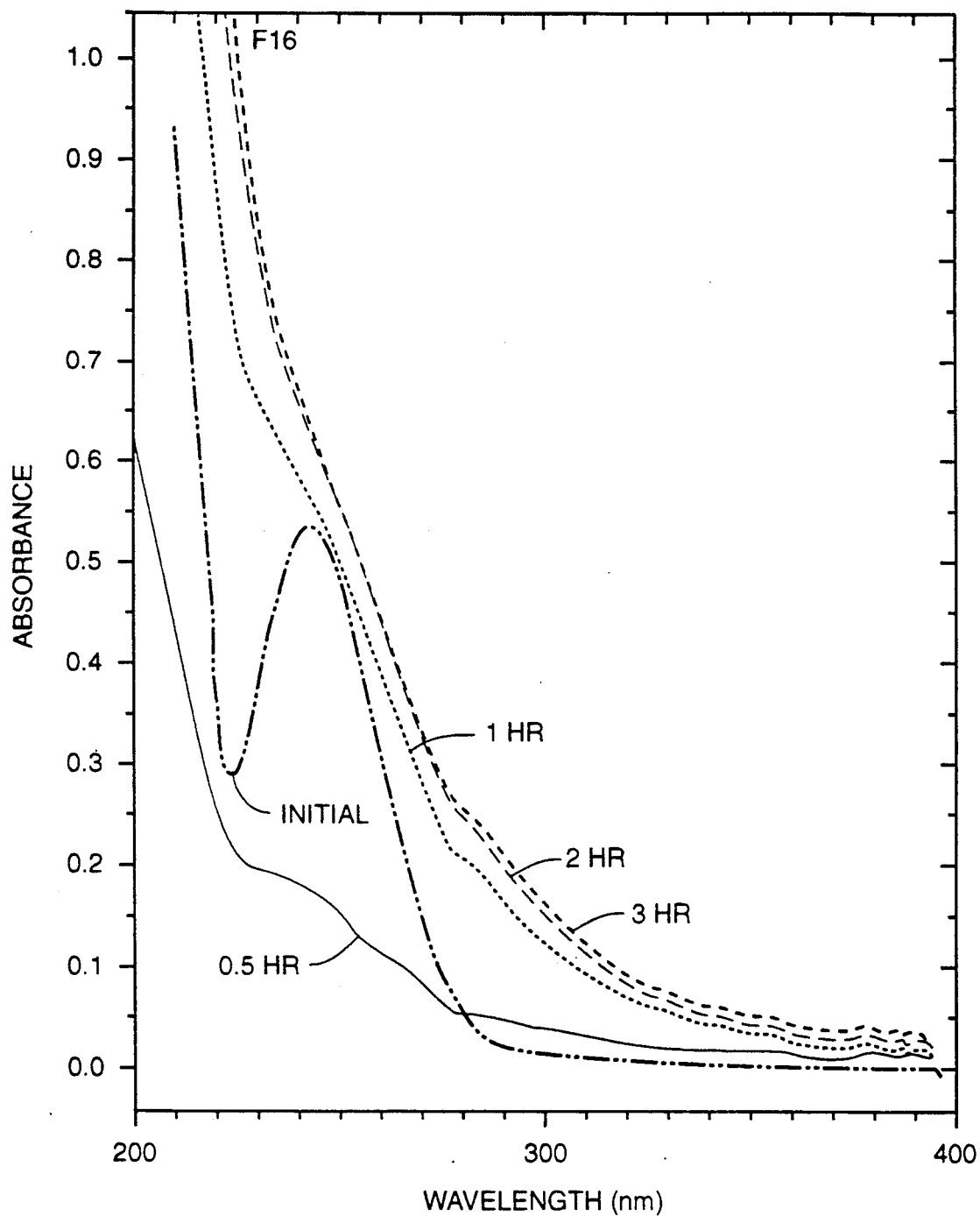
FIG._10

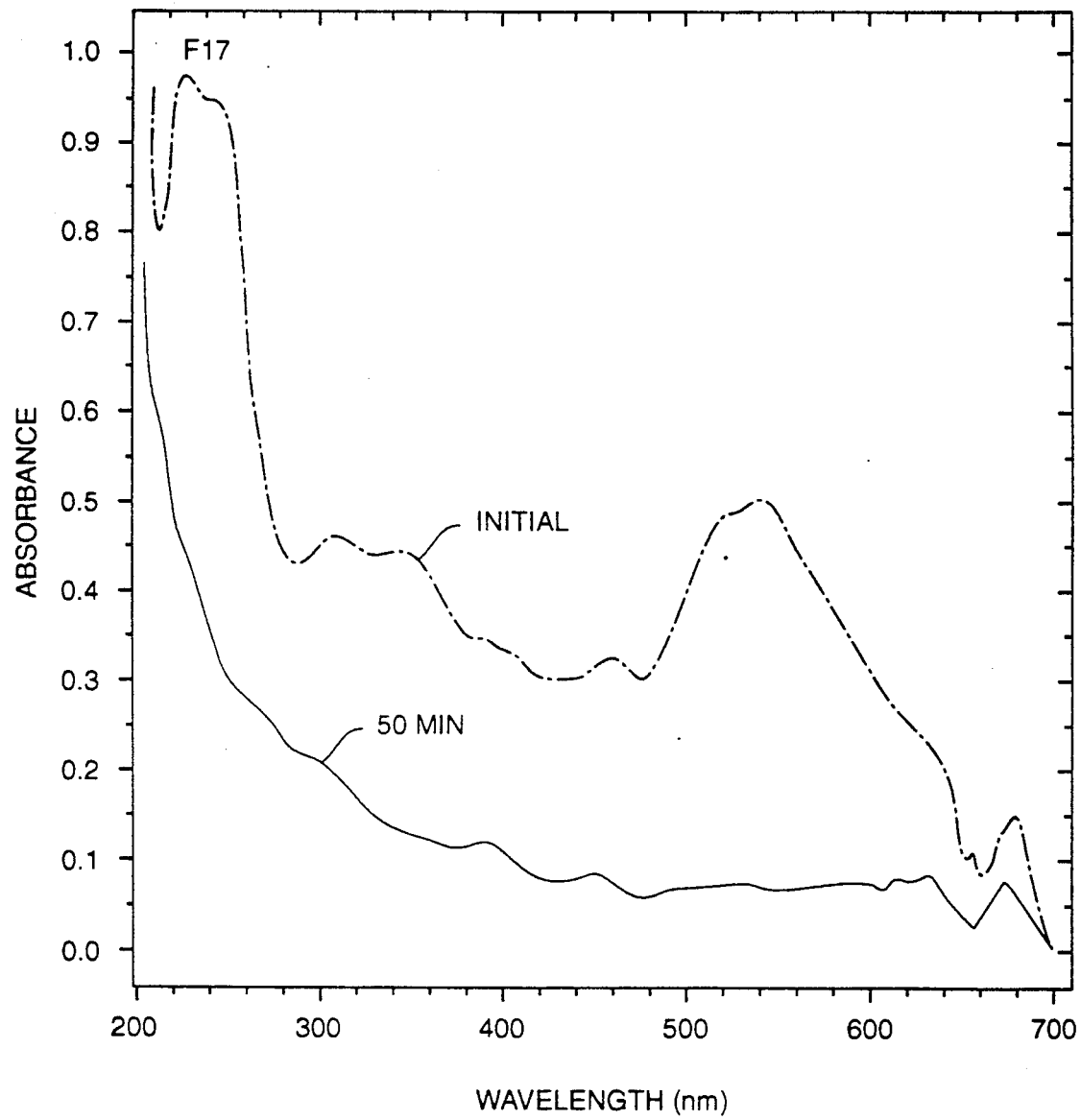
FIG._11

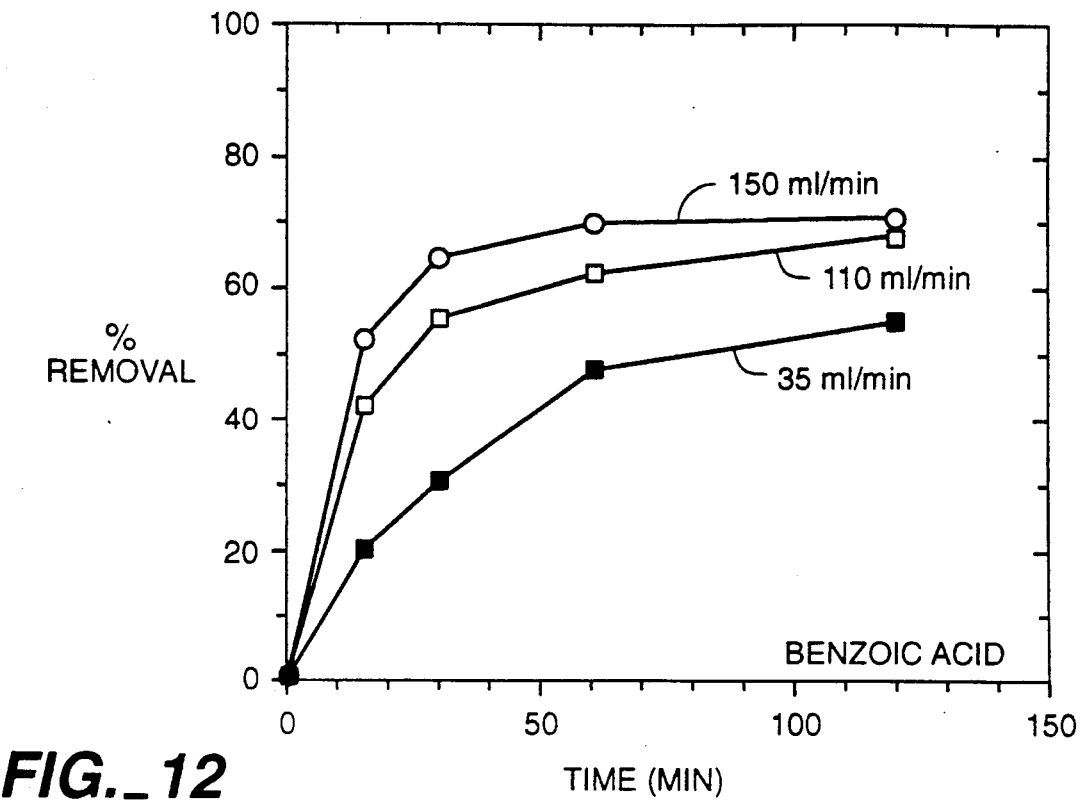
FIG._12
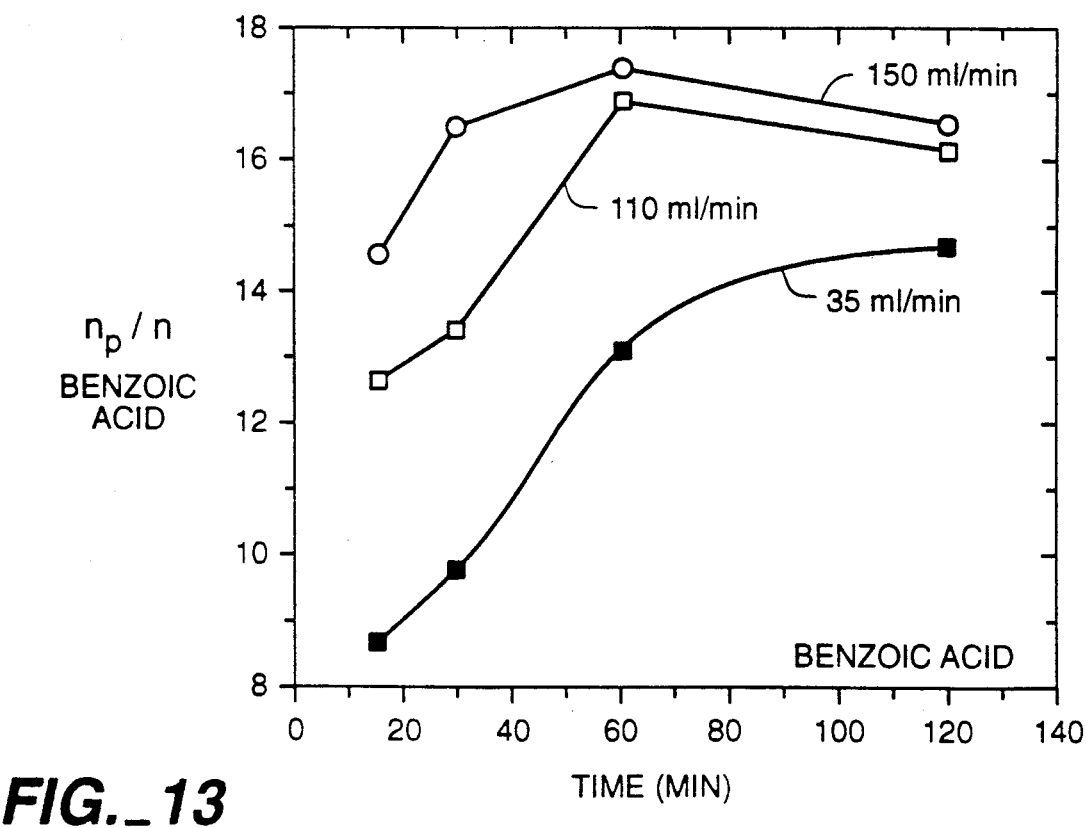
FIG._13

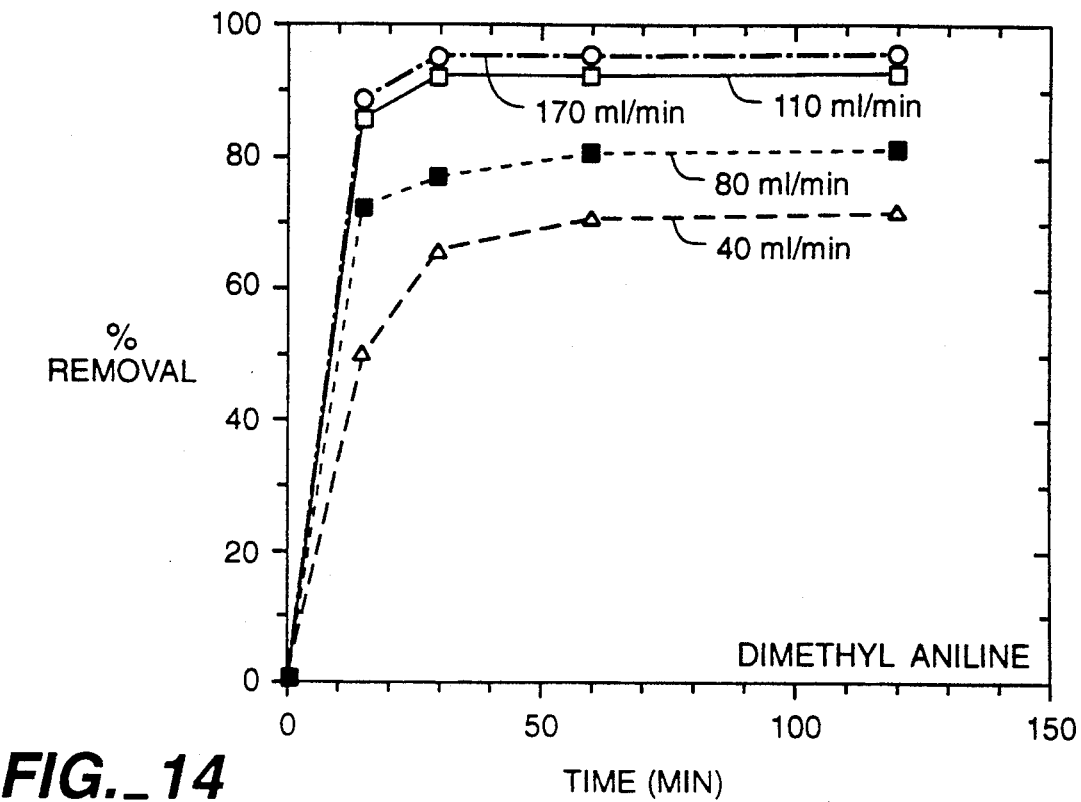
FIG._14
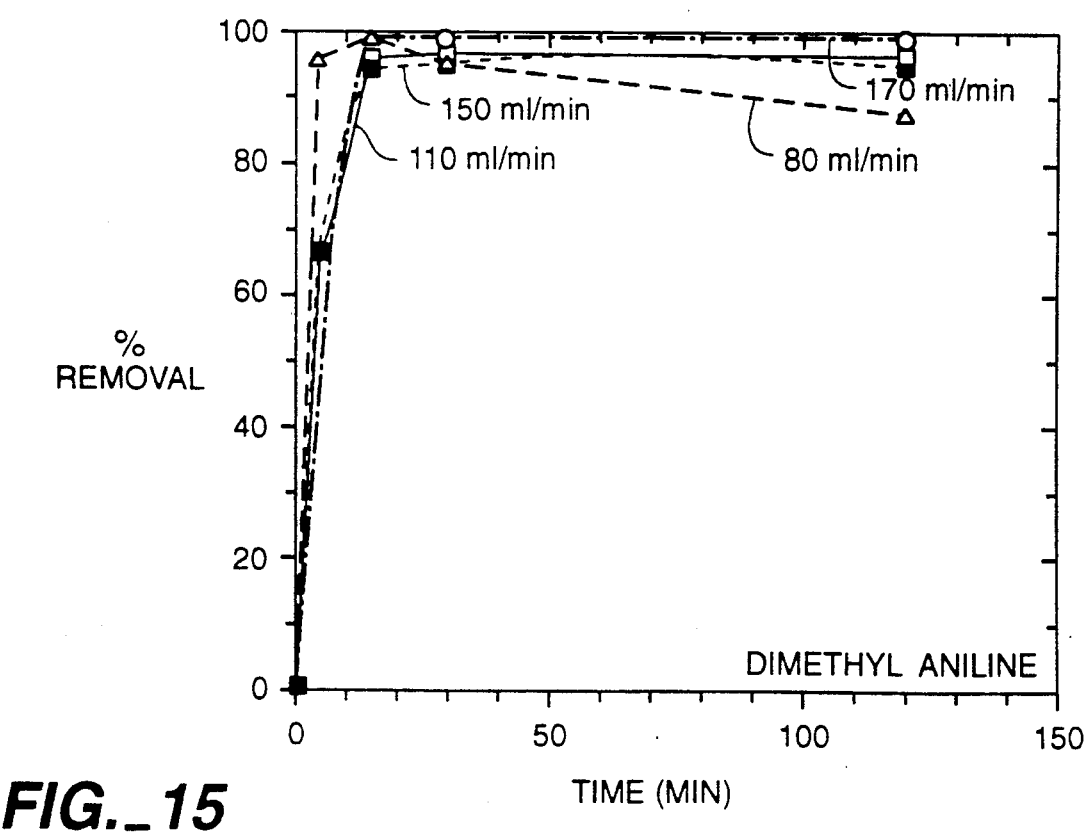
FIG._15

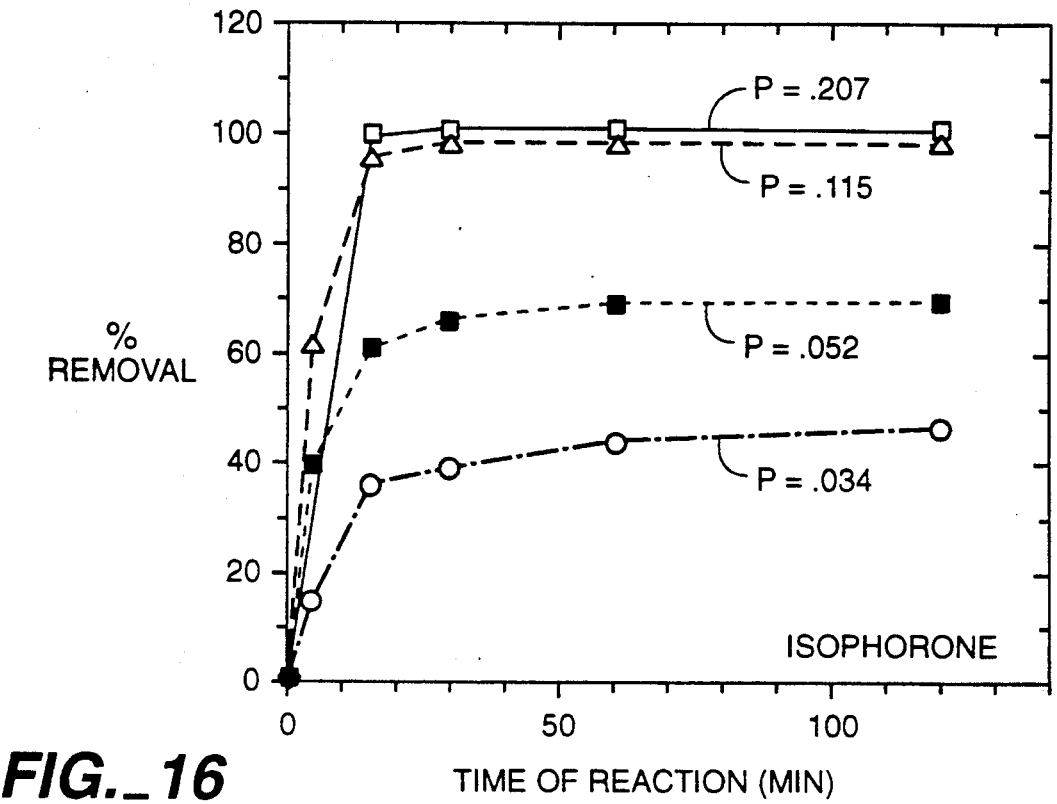
FIG._16
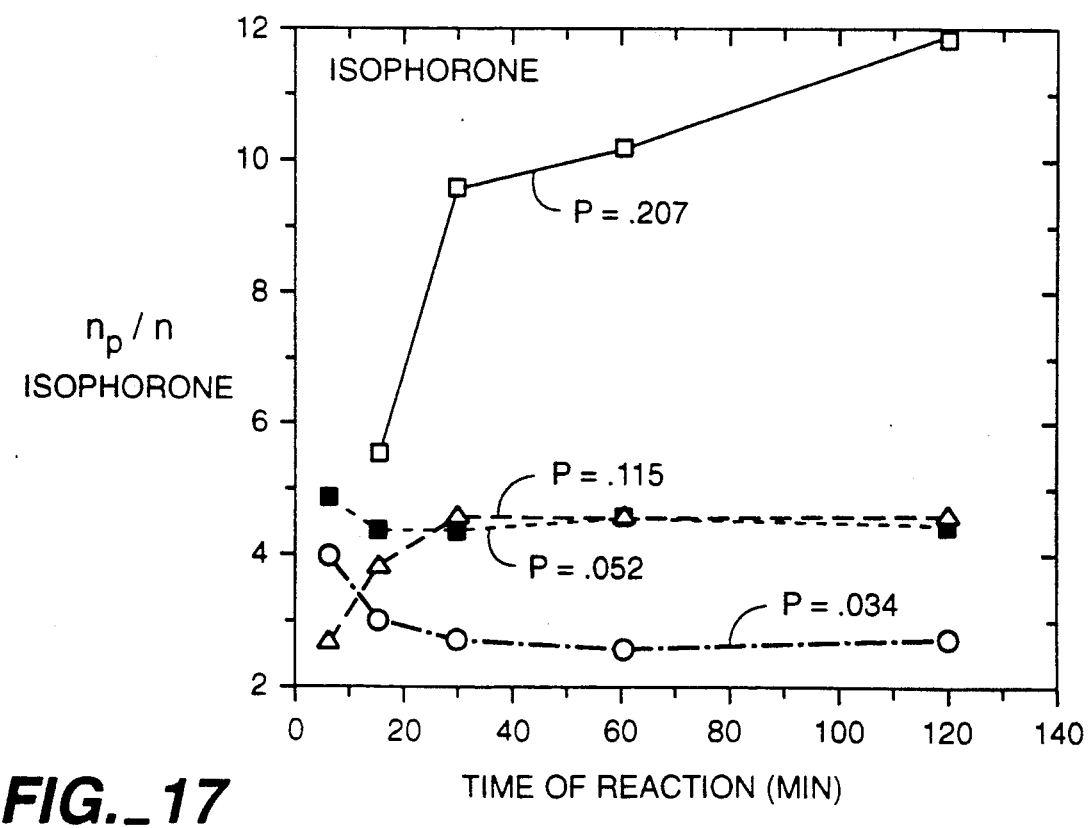
FIG._17

YELLOW PHOSPHORUS PROCESS TO CONVERT TOXIC CHEMICALS TO NON-TOXIC PRODUCTS

BACKGROUND OF THE INVENTION

Origin of the Invention

The present invention was supported in part by the U.S. Department of Energy under Contract No. DE-AC03-76SF00098 and administered through the Pittsburgh Energy Technology Center, Pittsburgh, Pa. The U.S. Government has specific rights in this invention.

RELATED DISCLOSURES

This application is a continuation-in--part application of U.S. Ser. No. 518,722, filed May 4, 1990 now U.S. Pat. No. 5,106,601 and of U.S Ser. No. 261,229, filed Oct. 24, 1988, now U.S. pat. No. 5,164,167 both of which are incorporated herein by reference in their entirety.

FIELD OF THE INVENTION

The present invention relates to a process to generate reactive species useful to destroy toxic organic and/or inorganic chemicals. Air is brought in contact with aqueous emulsions of molten yellow phosphorus. This process produces abundant reactive species such as O, $O_3$, PO, $PO_2$, and the like, which species are useful (particularly $O_3$) to react and destroy chemicals, especially toxic chemicals to non-toxic products. Further, in another aspect essentially pure phosphoric acid can be produced.

DESCRIPTION OF RELEVANT ART

Oxidation is one of the major routes by which toxic organic or inorganic contaminants are destroyed. Oxidation may take place via incineration, biological, and/or chemical processes. Incineration is more appropriate for treatment of concentrated waste in the non-aqueous state. oxidative biological degradation schemes can only eliminate those chemicals which are bio-degradable. Organic compounds, such as those containing nitro, chloro, and fluoro functional groups, heterocyclic hydrocarbon-containing nitrogen and/or sulfur, and polycyclic hydrocarbon, are often hardly biodegradable. Most of these chemicals are highly toxic and require treatment before discharge to the environment. The chemical oxidation process may be applied to these chemicals either as a treatment for the complete destruction of pollutants or as a pre-treatment for partial oxidation, thus increasing the amenability of the contaminants of the treatment by biological processes.

The chemical oxidation process commonly uses oxidizing agents such as chlorine gas, chlorine dioxide, hydrogen peroxide, ozone, and/or oxygen molecules in air. None of these oxidizing agents accomplish the desired oxidation without some problems. For instance, the use of chlorine gas and chlorine dioxide may generate toxic chlorinated by-products during treatment. Hydrogen peroxide is very expensive and is usually limited to oxidation of specific reactive species. Ozone is a more powerful oxidizing agent than hydrogen peroxide for most organics, and does not produce hazardous or chlorinated byproducts. However, ozone can not be shipped or stored, and must be generated on site or in situ immediately prior to its application. Ozonation is very expensive in both capital cost as well as power requirement. The use of the oxygen molecule requires high temperature and pressure conditions even in the presence of catalysts.

Wet processes of interest to remove NO include for example, West German Patent No. P 32 38 424.6 (Apr. 19, 1984) using red phosphorus. Additional U.S. patents of general interest include for example U.S. Pat. Nos. 3,984,522; 4,079,118; 4,158,044; 4,126,529 and 4,347,227. None of these references disclose the present invention.

What is needed is a simple and cost-effective technique for the generation of reactive free radicals and ozone. The present invention accomplishes this result by the rapid reaction of yellow phosphorus ($P_4$) with oxygen molecules in air to produce oxygen atoms and ozone in situ for subsequent use in oxidation of chemicals. In addition to producing oxidizing species, the reaction of $P_4$ with $O_2$ generates PO, $PO_2$ which may act as reducing species and provide additional mechanism for the decomposition of toxic chemicals.

SUMMARY OF THE INVENTION

The present invention relates to a process for reducing the concentrations of organic compounds and/or inorganic compounds in gas or liquid form, which method comprises:

A. contacting air or oxygen with an aqueous emulsion of molten yellow phosphorus ($P_4$), producing an aqueous or gaseous composition comprising oxygen atom (O), ozone, phosphoric acid, $P_4O_{10}$, PO or $PO_2$ or combinations thereof; and B. concurrently or sequentially contacting the composition of step (A) with an aqueous and gaseous composition itself comprising at least one organic compound, at least one inorganic compound, or a mixture thereof, for a time and at a temperature effective to reduce the concentration of the organic or inorganic compound present in the vapor or liquid. In a preferred embodiment, the reduction in concentration is greater than about 50% by weight.

In another embodiment, present invention relates to a process of obtaining ozone or phosphoric acid, each essentially free of organic and/or inorganic contaminants, which process comprises:

contacting air or oxygen with an aqueous emulsion of molten phosphorus ($P_4$) for a time effective to produce ozone and $H_3PO_4$ mists, transferring the gas stream now comprising air components, ozone and phosphoric acid mist, absorbing and separating the phosphoric acid mist producing uncontaminated liquid phosphoric acid, and producing a separate gas stream consisting essentially of uncontaminated ozone and components of air.

In preferred embodiments, a stirred reactor, agitating bubbler reactor, a spray tower reactor, and/or a generator/mist collector/packed bubbling reactor is used.

In another embodiment the present invention also includes the absorption of organic chemicals onto activated carbon. The removal of the organic chemicals using steam stripping or similar removal using conventional techniques (regenerating the activated carbon) followed by contact of the stripped gaseous organics with the gaseous ozone and other reactive species produced by the present process. This reduced concentration of organics by about 50% by weight, especially to or more than 99 or 99.9% by weight.

BRIEF DESCRIPTION OF THE FIGURES

FIG. 1 is a schematic representation of a stirred reactor (SR) having air, organic/inorganic, water and yellow phosphorus.

FIG. 2 is a schematic representation of an agitating bubbling reactor (ABR) showing feed lines and components.

FIG. 3 is a schematic representation of a spray tower reactor (STR) showing feed lines and components.

FIG. 4 is a schematic representation of the ozone generators, phosphoric acid mist collector, and packed bubbling reactor (G/MC/PBR) for the continuous process to destroy organic/inorganic chemicals, etc.

FIG. 5 is a series ultraviolet spectra as a function of time showing the decrease in concentration of nitrobenzene by contact with ozone and other reactive species produced from yellow phosphorus and air in a stirred reactor.

FIG. 5A shows a graph of the removal of nitrobenzene using yellow phosphorus and air as a function of time.

FIG. 6 is a series of ultraviolet spectra as a function of time for the decrease in concentration of aniline by contact with ozone and other reactive species produced from yellow phosphorus and air in a stirred reactor.

FIG. 6A is a graph of the removal of aniline using yellow phosphorus and air as a function of time.

FIG. 7 is two ultraviolet spectra of initial and after two hours of treatment showing the decrease in concentration of phenol by contact with ozone and other reactive species produced from yellow phosphorus and air in a stirred reactor.

FIG. 8 is a series of ultraviolet spectra as a function of time for the decrease in concentration of chlorobenzene by contact with ozone and other reactive species produced from yellow phosphorus and air in a stirred reactor.

FIG. 9 is an ultraviolet spectrum of naphthalene before the contact with ozone and other reactive species produced from yellow phosphorus and air in a stirred reactor.

FIG. 9A is a series of UV spectra as a function of time showing the removal of naphthalene and the formation of products using phosphorus and air.

FIG. 10 is a series of ultraviolet spectra as a function of time showing the decrease in concentration of AROCHLOR ® 1221 and the formation of products by contact with ozone and other reactive species produced from yellow phosphorus and air in a stirred reactor.

FIG. 11 is an ultraviolet spectra as a function of time at 0 and 50 min for the decrease in concentration of Eriochrome black T by contact with ozone and other reactive species produced from yellow phosphorus and air in a stirred reactor.

FIG. 12 is a graphic representation showing the effect of air flow rate on the efficiency of benzoic acid removal (destruction) as a function of time.

FIG. 13 is a graphic representation showing the effect of different air flow rates on the stoichiometric ratio of phosphorus to benzoic acid in the removal (destruction) of benzoic acid as a function of time.

FIG. 14 is a graphic representation showing the effects of a series of different air flow rates in the efficiency of dimethyl aniline removal as a function of time (solution is circulated from the bottom to the middle inlet of the reactor without spraying in the ABR reactor).

FIG. 15 is a graphic representation showing the effects of a series of different air flow rates in the efficiency of dimethyl aniline removal as a function of time (with circulation of the solution to the top inlet which is equipped with spray nozzles in the ABR reactor).

FIG. 16 is a graphic representation showing the effects of phosphorus dose concentration on the removal efficiency of isophorone as a function of time.

FIG. 17 is a graphic representation showing the effect of stoichiometric ratio of phosphorus to isophorone in the removal of isophorone as a function of time.

DETAILED DESCRIPTION OF THE INVENTION AND PREFERRED EMBODIMENTS

Definitions

As used herein:

"Aliphatic halogen compounds" refers to mono or poly (di-, tri-, tetra-, etc.) halogen containing saturated and unsaturated aliphatic compounds having from 1 to 40 carbons, preferably about 1–20 carbon atoms. Halogen is fluoro, chloro, bromo or iodo. Then include, for example, chloromethane, dichloromethane, trichloromethane, tetrachloromethane, bromoethane, dibromoethane, all FREONS ®, iodomethane, vinyl chloride, dichloroethane and the like.

"Aliphatic hydrocarbons" refers to saturated or unsaturated hydrocarbons (linear or branched) having from 1 to 40 carbon atoms, preferably from 1 to 20 carbon atoms, e.g., methane, propane, butane, isobutane, tert-butane, hexane, decane, cosane, ethane, propene, 1-butene, 1-dodecene, 1-cosene and the like.

"Aliphatic acids" refers to mono or poly (di, tri-, tetra-)carboxylic saturated or unsaturated acids having from 1 to 40 carbon atoms, preferably from 1 to 20 carbon atoms. These include, for example, acetic acid, butanoic acid, oxalic acid, succinic acid, tartaric acid, decanoic acid, cosanoic acid, acrylic acid, methacrylic acid, linoleic acid, fumaric acid and the like.

"Aliphatic alcohols" refers to mono or poly (di, tri-, etc.) saturated and unsaturated alcohols having from 1 to 40 carbon atoms, preferably between 1 to 20 carbon atoms. These include, for example, methanol, ethanol, butanol, glycols, 1-decanol, 1-cosanol, sugars, vinyl alcohol, 1, 4-butynediol, and the like.

"Aliphatic amines" refers to mono or poly (di or tri, etc.) saturated and unsaturated amines having from 1 to 40 carbon atoms, preferably between about 1 to 20 carbon atoms. These include, for example, methyl amine, butyl amine, 1,4-diaminobutane, 1-amino-decane, 1-aminocosane, ally amine and the like.

"Aromatic compounds" refers to but is not limited to cyclic unsaturated structures having 3 to 40 carbon atoms, preferably 4 to 20 carbon atoms. Representative compound include but are not limited to benzene, toluene, xylene, styrene, naphthalene, anthracene, alkyl benzenes, alkyl naphthalene, phenanthrene and the like.

"Heterocyctic aromatic compounds" refers to any of the aromatic compounds described and defined herein where one or more of the aromatic carbons is replaced by oxygen, nitrogen or sulfur. Representative compounds include but are not limited to, furan, pyran, pyridine, pyrrole, quinoline, thiophene, thiopyran, oxazole, and the like.

"Inorganic compound" refers to, conventionally defined inorganic compounds and is not limited to inorganic cyanide, OCN, SCN, hydroxylamine, nitrosoamine, dithionate, hydroxyl amine disulfonate, amine trisulfonate, amine disulfonate, sulfamate, nitrosodisulfonate and mixtures thereof.

"Non-toxic chemicals" refers generally to those compounds, intermediates, or fragments which pose no health or environmental hazard to mammals, e.g., a human being. Examples include intermediates or fragments which can be further biodegraded. Examples include but are not limited to water, oxygen, nitrogen, carbon dioxide, hydrogen, and the like.

"Organic compound" refers to conventionally defined organic compounds, and refers to but is not limited to aliphatic hydrocarbons, aromatic hydrocarbons, unsaturated aliphatic hydrocarbons, unsaturated aromatic hydrocarbons, aliphatic halogen compounds, aromatic halogen compounds, polychlorinated biphenyls, polybrominated biphenyls, nitroaromatics, aliphatic amines, aromatic amines, aliphatic acids, aromatic acids, aliphatic alcohols, aromatic alcohols, cyclic ketones, linear aliphatic ketones, aromatic ketones, aliphatic chlorides, aromatic chlorides, aromatic N-heterocyclics, dialkyl sulfides, chlorinated benzodioxins, organophosphorus pesticides and combinations thereof.

"Unsaturated aliphatic hydrocarbons" refers to linear or branched compounds having one or more C=C or one or more C≡C or combinations thereof having 2 to 30, preferably 2 to 20 carbon atoms. Representative alkenes include, for example, ethene, propene, 1-butene, 1-decene, 1-cosene, 1,4-butadiene, 1,3,5-hexatriene, and the like. Representative alkynes include, for example, acetylene, diacetylene, vinyl acetylene, 1,4-butadyne, 1-decyne, 1-cosane and the like.

"Yellow phosphorus" refers to commercially available yellow or white phosphorus (99.9+% pure), not red or black phosphorus. It usually has the following properties:

Wax-like metastable solid with respect to red phosphorus, an impurity often present in white allotrope, bp 280° C., vapor density corresponds to formula $P_4$, mp 44.1° C., density (solid 20° C.) 1.82; (liquid at 44.5° C.) 1.745, Mohs hardness 0.5, high electrical resistivity, insoluble in water and alcohol, soluble in carbon disulfide, exhibits phosphorescence at room temperature, and is an essential dietary nutrient.

Derivation: $P_4$ is produced in an electric furnace from phosphate rock, sand, and coke. The phosphorus vapor is driven off and condensed under water.

Grade: Technical 99.9%, electronic grade 99.9999%.

Occurrence: ($P_4$) occurs in nature in phosphate rock (impure $Ca_3(PO_4)_2$), in apatite ($Ca_5(PO_4)_3F$), in bones, teeth and in organic compounds of living tissue. Also as phosphorite nodules on ocean floor.

Hazard: ($P_4$) ignites spontaneously in air at 86° F. (30° C.), store under water and away from heat, dangerous fire risk. Toxic by ingestion and inhalation, skin contact causes burns. TLV: 0.1 mg/m$^3$ of air.

In the present invention phosphorus ($P_4$) is converted to $P_4O_{10}$ which then produces phosphoric acid mists in the presence of water. The phosphoric acid recovered has a high purity for commercial use. An additional benefit of one of the present processes is that this technique is developed such that the by-product high purity phosphoric acid is obtained without any contamination by chemical species in the contaminated liquors treated. The $P_4$ is cheaper than phosphoric acid on a phosphorus weight basis. Consequently, there is a net increase in the value of chemical reagents as a result of this treatment.

This process is a cheaper and more convenient way to generate ozone than the conventional method using an electric discharge. It is demonstrated that ozone is very efficient for destroying various types of organic and inorganic toxic waste over a wide concentration range at a very short time of treatment.

Chemical compounds representing different structural types are selected for examination by this process. The compound groups examined include, for example, but are not limited to, (corresponding structural types indicated) nitrobenzene (nitroaromatics); aniline and/or dimethyl aniline (aromatic amines); benzoic acid (aromatic acids); phenol (aromatic alcohols); isophorone (cyclic ketone); chlorobenzene (aromatic chloride); AROCLOR® 1242 and/or 1221 (Polychlorinated Biphenyls-PCBs); 1,1-dichloroethane, chloroform, and carbon tetrachloride (aliphatic chlorides); toluene and/or naphthalene (neutral aromatic hydrocarbons); pyridine (aromatic N-heterocyclics); diethylsulfide (dialkyl sulfide); 1-(1-hydroxy-2-naphthylazo)-5-nitro-2-naphthol-4-sodium sulfonate (Eriochrome black T, azodyes); or rogor (organophosphorus pesticides).

In this process yellow phosphorus oxidizes in the presence of oxygen (or air) to produce $P_4O_{10}$ (which is commonly referred to as phosphorus pentoxide ($P_2O_5$)).

The $P_4O_{10}$ associates with any water (or water vapor) present to produce phosphoric acid as a mist which can be collected. The minimum contact for the compound(s) to be converted is about 0.5 sec. for the spray type scrubber and about 0.05 sec. for a bubbling type scrubber.

This destruction of organic or inorganic compounds has wide utility and conditions (e.g. contact time, spray tower, bubble, countercurrent, cocurrent, etc.).

One of skill in the art based on this disclosure can select the equipment, concentrations, flow rates, etc. based upon the size of the equipment used. For example, if a larger reaction system is used, the contact time desired or required to destroy the compounds with ozone and other reacting species will depend upon the destruction efficiency desired for the specific toxic compounds involved.

The factors which influence the effectiveness of organic or inorganic compound destruction include the specific organic(s) or inorganic(s) used, the amount of yellow phosphorus present, the temperature of the aqueous emulsion, the pH of the aqueous emulsion, and the contact time of the compounds with the emulsion, and the oxygen (or ozone) concentration present.

The pressure is usually not critical, and the process is generally carried out at ambient, or such positive pressures need to move the gases through the equipment system.

The concentration of yellow phosphorus required is low because any amount is functional but it should be above about 0.001% by weight in the aqueous emulsion or suspension and preferably above about 0.1% by weight. The upper (or high) level is any amount of $P_4$ that allows for enough water to carry out the reactions and provide for enough water to carry out the reactions. The concentration may be 20% by weight or higher at the beginning of the reactions.

The product phosphoric acid is recovered by a variety of methods, preferably by absorbing the phosphorus "white smoke" with concentrated phosphorus acid (40-60% by weight).

A preferred range of yellow phosphorus to water is about 0.1 to 10% by weight, and more preferably between about 0.2 to 5% by weight. The pH also varies over a large range and about any pH value appears to be operative. However, a preferred range is between about 2 and 10, especially between about 3 and 9.

The following text describes the present invention with regard to FIGS. 1 to 17.

FIG. 1 shows a stirred reactor set-up (SR) 10, agitated by a magnetic stirrer (11) (or equivalent stirring means) to mix the liquid components (comprising organic compounds and/or inorganic compounds 12, water 13 and molten $P_4$ (14). Above the liquid is an air space (15) which is accessible by a sampling port (16) to monitor the progress of destruction.

FIG. 2 shows an agitating bubbler reactor (ABR) 20 connected to various feed and effluent lines. The phosphorus 21, water 22, and compounds 23 are initially placed in tower 28 and subjected to the process conditions. If additional materials need to be added this may occur at any point in the circulating solution, e.g., at line 24 as water phosphorus 21A, water 22A and compounds 23A. Optionally, the $P_4$ 21, water 22 and compound(s) 23 are mixed, enter at line 24 conveyed via line 25 and either line 26 or line 27 and are sprayed into the tower (28) optionally containing barriers (29) (e.g. sieve plates). The solution(s) are sprayed using nozzles (30) from the top inlet (31) via line 1 (26) or using an optional middle inlet (32) and nozzles (22) via line 2 (27). The solution circulation flow is directed using vales 34A, 34B or 34C through the lines using pump (35). Air (or oxygen) 36 enters at the bottom port (37), optionally being dispersed using a frit 38, e.g. sintered glass. A metallic rod 39 connected to the sieve plates is used to agitate the reaction solution during the progress of the reaction. The air can vent through line 26A.

FIG. 3 shows a spray tower reactor (STR) 40 with feed lines and equipment components. The compounds 41, $P_4$ 42 and water 43 are heated in a vessel 44 and pumped (via pump 45) through line 46 and 47 to the top of the spray tower 48. The reaction solution i then sprayed out nozzles 49 into an open space 50 where the solution contacts air or oxygen 51 entering the tower 48 via line 52. The exhaust 53 exits form the top of the tower 54.

FIG. 4 shows an equipment set-up for a continuous reaction flow process 60. Air or oxygen 61 enters via line 62 to the bottom of a bubbler 63. The gas is dispersed through a frit 64, e.g. sintered glass. The heated bubbler contains molten $P_4$ (65) and water (66) and a temperature monitor 67 e.g., a thermometer or thermocouple. The mist 68 exits via line 69 and enters the gas washing vessel 70 into a liquid 71 which is about 40-85% by weight phosphoric acid.

The essentially uncontaminated ozone 73 (optionally with air) exits via line 74 from vessel 70 and enters a conventional packed column 75 containing the organic or inorganic compound 76 and water 77. The concentration of the organic or inorganic compound is reduced significantly in column 75. The exiting vapor 78 optionally is recycled. The organic or inorganic compound can be continuously added to the system via line 79.

The following Examples and Experiments are provided to be descriptive and expletive only. They are not to be construed as limiting in any way.

Experimental Section

The destruction of organic compounds relies on the reactions of organics with reactive intermediates, such as O, $O_3$, generated from the interaction of $P_4$ with $O_2$ in moist air. Most of the reactive intermediates are gaseous species, which can destroy toxic chemicals in gas as well as the aqueous phase. These intermediates destroy non-vaporized portion of the organics in water after dissolution. Consequently, organic destruction was more efficient when carried out in a device with an effective gas-liquid contact arrangement. The concentration of organics as a function of treatment time were measured by appropriate analytical techniques, including uv-visible spectroscopy, gas and ion chromatography.

EXAMPLE A

General Experimental Description

Reactors with several different gas-liquid contact arrangements are employed including but not limited to:

1. A stirring reactor (SR, FIG. 1) where air and aqueous mixtures are enclosed in a flask, e.g., 500 ml. The aqueous mixtures are comprised of water (e.g. 100 ml), $P_4$, and the organics or inorganics to be treated, and are stirred with a magnetic stirrer during the process. The enclosed reactor prevents the vaporization loss of organics or inorganics.

2. An agitating bubbling reactor (ABR, see FIG. 2) is used. The reactor is a glass column, 4.5 cm in diameter and 28 cm in height, having a sintered glass frit located near the bottom of the column. The sintered glass frit serves to disperse the air flowing into an aqueous mixture and thus increases gas-liquid contact. Agitation of the aqueous mixtures is performed by a set of circular stainless steel sieve screens installed in parallel, with a distance of about 1 in from each other, attached to a metallic rod. The metallic rod is attached to an electric motor. As the motor rotates, the rod and the sieve screens move in an up and down fashion, with an amplitude of about 1 inch and at a frequency of 200–300 cubic feet per minute. $P_4$ melts at 43° C. It is immiscible with water and forms globules upon stirring. $P_4$ has a specific gravity of 1.8 and tends to settle in water. Agitation reduces the size of the $P_4$ globules and improves the mixing of $P_4$ with air and water. The aqueous mixture is circulated via a centrifugal pump from the bottom to either the top inlet or the middle inlet of the reactor. The top inlet is equipped with two spray nozzles, while the middle inlet is not. Circulation of the aqueous mixtures prevents the $P_4$ globules from accumulating at the bottom of the reactor.

3. A spray tower reactor is shown (See FIG. 3) where the air is contacted, either countercurrently or cocurrently, fine aqueous droplets sprayed downward by nozzles located in a cylindrical glass column. The glass column is about 4 inches in diameter by 4 ft long and is equipped with ten nozzles, arrange din two parallel rows with each row containing 5 nozzles in series. About 2-1 of the aqueous mixture of $P_4$ and organics are contained in a 4-1 Erlenmyer flask circulated by a centrifugal pump and sprayed through nozzles. The sprayed liquors are collected in the Erlenmeyer flask and are recirculated. Air enters the reactor either from the bottom (counter-current) or at the top (co-current) of the reactor at a flow rate ranging between 50 and 400 liter/min.

4. A set-up with a combination of an ozone generator, a phosphoric acid mist collector, and a packed bubbling reactor in series (G/MC/PBR, FIG. 4). A bubbler is used to generate ozone. $P_4$ in water is bubbled with air at greater than 45° C. A gas stream carrying reactive intermediates (generated from the interaction of $P_4$ with oxygen molecules in air), phosphoric acid mists, water vapor, and the air components are passed through a mist collector (e.g., a gas washing bottle containing phosphoric acid and/or a glass fiber aerosol filter) to remove phosphoric acid mists before entering into a packed bubbling reactor, where an aqueous solution containing organics (or inorganics) is treated.

EXAMPLE B

General Procedure

A general experimental procedure is described as follows:

1. An aliquot of aqueous solution containing organics or inorganics to be treated is transferred into the reactor and is adjusted to the desired temperature (about 50° C.). A known amount of $P_4$ is added to the solution in the reactor (SR, ABR, or STR) or generator (G in the G/MC/PBR system). Treatment is initiated by either stirring the aqueous mixtures (SR) or by flowing air into the system (ABR, STR, or G/MC/PBR). The appearance of white fumes indicates the formation of $P_4$ oxidation product, phosphoric acid mists.

Organics (or inorganics) are examined to determine whether their destruction occurred as a result of the $P_4$ treatment. The concentration of organics in water as a function of treatment time is determined. Of those organics chosen for study, some are tested to determine whether they are decomposed by this technology. On the other hand, several organics, including nitrobenzene, dimethyl aniline, isophorone, and phenol are studied in a more detailed manner. For the latter organics, the effect of treatment time, air flow rate, concentration of organic (or inorganic) and $P_4$ in solutions, temperature and Ph of solutions on the percent removal and the stoichiometric ratio are investigated. The percent removal measures the degree of destruction of organics. The stoichiometric ratio is the molar ratio of the total phosphorous oxyanions formed to organics destroyed and thus represents the $P_4$ utilization efficiency.

EXAMPLE 1

$P_4$ Treatment to Evaluate Destruction Feasibility

One set of experiments described below involves a determination of the destruction feasibility of different structure-type organics by $P_4$ treatment. Representative organics from each structure type (above) are chosen for examination with an SR (FIG. 1) set-up. The decrease in intensity of an absorption band with treatment time is observed for nitrobenzene (see FIGS. 5 and 5A), aniline (see FIGS. 6 and 6A) phenol (see FIG. 7), chlorobenzene (see FIG. 8), naphthalene (see FIG. 9 and 9A), AROCLOR® 1221 (see FIG. 10), and Eriochrome black T (see FIG. 11), indicating that the concentration of organics decreases upon treatment. The oxidation products of $P_4$, phosphorus oxyanions, do not absorb in the spectrum wavelength region shown. The temperature of aqueous mixture during the treatment is 50° C. for all of the experiments. The initial concentration of organics and $P_4$ are: nitrobenzene, 604 ppm with $P_4$, 0.5 g; aniline, 425 ppm with $P_4$, 1 g.; phenol, 936 ppm with $P_4$, 0.5 g; chlorobenzene, 276 ppm with $P_4$, 0.5 g; naphthalene, 10 ppm with $P_4$, 0.5 g; AROCLOR® 1221, 22 ppm with $P_4$, 0.5 g.; and Eriochrome black T, 50 ppm with $P_4$, 0.5 g.

The removal efficiency of nitrobenzene and aniline as a function of treatment time are plotted as shown in FIG. 5A and FIG. 6A respectively. The first hr of treatment removes 53% of the nitrobenzene; however, only 74% is removed after 2 hr. This result indicates that the rate of removal decreases along with the treatment time under the experimental conditions employed. This chemical behavior is also observed for other organic compounds. For example, FIG. 6A shows that the first 5 min of the process destroys 77% of the aniline, while 94% is removed after 10 min of treatment. FIG. 7 shows that 37% of the phenol is removed after 2 hr of treatment. FIG. 8 shows an initial rapid reduction in absorption intensity at 208 nanometers (nm), indicating that almost all of the chlorobenzene is destroyed after 5 min of treatment. The appearance of a new absorption band at 217 nm, and the subsequent increase of its intensity, along with the treatment time after 5 min, is probably due to the formation of decomposition products of cholorobenzene.

FIGS. 9 and 9A show a substantial reduction of naphthalene absorption intensity at 265–285 nm after 5 min of treatment. This result indicates that a major fraction of naphthalene has been destroyed. A continuous treatment results in an increase in absorption intensity of four new absorption bands at 252, 262, 272, and 284 nm, which is probably due to the decomposition products of naphthalene. FIG. 10 shows a large reduction of AROCHLOR® 1221 absorption intensity at 244 nm after 0.5 hr of treatment, indicating an almost complete destruction of the compound. Further treatment results in the increase of structureless continuous absorption band, pointing to the formation of decomposition products.

EXAMPLE 2

Efficiency and Stoichiometry

A second set of experiments deals with a parametric study of the efficiency and stoichiometric ratio of organic chemical destruction. The parameters investigated include air flow rate and the concentration of organics and $P_4$ used. These experiments are performed in an ABR set-up (see FIG. 2) at about 50° C. Organics chosen for this study are benzoic acid, dimethyl aniline, isophorone, phenol, and pyridine. The initial concentration of organics ranges between 240 ppm and 960 ppm, while the concentration of $P_4$ ranges from 0.11 g. to 1 g. The total volume of aqueous mixtures is 250 ml. Air flow rate varies from 40 to 170 ml/min. Organics and phosphorous oxyanions are analyzed by ion chromatography. Blank experiments are performed to ensure that the loss or organics due to vaporization is insignificant.

EXAMPLE 2A

Efficiency-Air Flow Rate

The effect of air flow rate on the efficiency and stoichiometric ratio of benzoic acid destruction are shown in FIG. 12 and FIG. 13, respectively. Initial concentrations of benzoic acid and $P_4$ were 250 ppm and 0.4 g., respectively. The aqueous mixture is circulated from the bottom back to the middle inlet (without spraying) of the reactor. Three air flow rates are examined: 35, 110, and 150 ml/min. The results indicate that the removal efficiency increases with the increase of air flow rate at a given time of treatment. However, the effectiveness of $P_4$ utilization decreases, as demonstrated by the increase of stoichiometric ratio, with the increase of air flow rate. The increase of air flow increases the reaction rate of oxygen with $P_4$; thus increasing the concentration of reactive radicals, such as O, $O_3$, available for interaction with organics. The increase of removal efficiency shows a slowdown, and then levels off with the increase of treatment time. This behavior is also observed for the other organic chemicals examined. Also, decomposed organic chemicals may react further and consume reactive radicals, which results in a slowdown of the rate of removal of the parent organic chemicals. The concentration ratio of parent organic chemicals to decomposed products decreases with the increase of contact treatment time. The decrease in organic and $P_4$ concentrations along with the reaction time are probably related to this behavior. The decomposition products identified include formic, malonic, and oxalic acids.

Experiments of dimethyl aniline are performed at an initial concentration of 240 ppm dimethyl aniline and 0.3 g. $P_4$, at a temperature of 50°-55° C. Air flow rate is varied from 40, 80, 110, and 150 ml/min. The results from two different routes of solution circulation are shown in FIGS. 14 and 15. FIG. 14 is a reaction with solution circulated from the bottom to the middle inlet of the reactor without spraying, while FIG. 15 is an experiment with a circulation of solution to the top inlet equipped with spray nozzles. The removal efficiency is better with spraying. This shows that effective gas liquid contact improves the efficiency. More than 90% of dimethyl aniline is destroyed in less than 30 min, when the air flow rate is 110 ml/min or larger. The removal efficiency of dimethyl aniline as a function of time shows similar behavior to that of benzoic acid; i.e., increasing removal with increasing air flow rate and approaching a limit value with prolonged treatment. Destruction products identified, by ion chromatography, in order of decreasing abundance are acetic, formic, oxalic, and malonic acids.

EXAMPLE 2B

Aliphatic Ketone

Isophorone is one of four model organics (in addition to phenol, carbon tetrachloride, and chloroethane) selected for a waste management study. Isophorone is a suspected cancer agent. The experiment with isophorone is carried out with a circulation of solution (no spraying) at 50°-55° C., and with an air flow rate of 40 ml/min. The initial concentration of isophorone is 224 ppm. The dosage of $P_4$ initially added to the aqueous mixture is varied at 0.034, 0.052, 0,115, and 0.207 g. The concentration of isophorone during the course of experiments is monitored by gas chromatography. Isophorone is extracted from an aqueous sample with chloroform before the analysis. FIGS. 16 and 17 show the effect of $P_4$ dosages on the removal efficiency and stoichiometric ratio, respectively. The more $P_4$ dosage used, the larger the removal efficiency and the lower the effectiveness of $P_4$ utilization are observed. Almost all of the isophorone is destroyed in less than 20 min, when the initial $P_4$ concentration is 0.11 g. or more. More than 95% removal efficiency with a stoichiometric ratio of less than 5 is achieved when 0.115 g $P_4$ is used. Formic acid is detected as a destruction product of isophorone.

EXAMPLE 3

Other Organic Chemicals

In addition to the organic chemicals listed above, several other chemicals were examined in a qualitative manner with the ABR equipment set-up. When dichloroethane, carbon tetrachloride, and chloroform are treated, chloride ion and small molecular weight organic acids are detected by ion chromatography. Formic acid is observed in the case of carbon tetrachloride, while formic as well as trace amounts of oxalic acids are detected after chloroform is treated. This result demonstrates that a saturated aliphatic chloride is destroyed by this technique. These types of organics cannot be destroyed by ozone treatment alone. The above result indicates that $P_4$ oxidation produces not only O and $O_3$, but also other reactive radicals which destroy organic, as well as inorganic, compounds. Another experiment dealt with an insoluble toxic waste. AROCHLOR ® 1242, a liquid PCB, is not miscible with water. When an aqueous mixture of AROCHLOR ® 1242 is treated according to this process, chloride ion is detected, indicating that AROCHLOR ® has been decomposed. Also observed is the oxidation of dimethyl sulfide to produce organic acids and sulfate ion, and the destruction of dithionate ion to form sulfite and sulfate ions.

EXAMPLE 4

Effectiveness of the Spray Tower

The third type of experiments determine the effectiveness of a conventional spray tower when used for toxic chemical treatment. Results from one experiment show that about 70% of the starting benzoic acid is destroyed in less than 30 min when the initial concentration of benzoic acid is 120 ppm, and the concentration of $P_4$ is 3.9 g. in 2-1 of water. The air flows in countercurrent manner at a rate of 75 l/min. The removal efficiency appears to be better than those obtained in a SR set-up (See FIG. 1).

In all of the experimental set-ups mentioned above, $P_4$ is added to aqueous solutions containing the toxic chemical during treatment.

The oxidation products of $P_4$, i.e., phosphorus oxyanions, remain in the liquors, and therefore require removal to prevent the liquors from contamination by these species. This removal is accomplished by adding calcium salts, such as limestone, to the liquors to precipitate phosphorus oxyanions as their corresponding calcium salts. An alternative removal method uses microorganisms to consume the phosphorus-containing compounds, as well as the broken-down organic or inorganic compounds. Also the residual $P_4$ must be removed to ensure that the liquors are freed from $P_4$ before being discharged to the environment. The removal of $P_4$ from liquors is done by oxidation, which is carried out by continuous air bubbling at elevated temperatures or by adding oxidizing agents.

EXAMPLE 5

Non-Contact of $P_4$ and Oxidation Products With Toxics

An experimental set-up is devised so that $P_4$ and its oxidation products do not contact toxic chemicals to be treated. As a result, a separation or treatment of phosphorus-containing species is not necessary after destruction of the toxic chemicals. The experimental set-up is shown in FIG. 4, and is described below in Example 6. This set-up represents a new type of ozone generator. Ozone is generated by bubbling air through an aqueous emulsion of $P_4$. Another type of contact between air and aqueous emulsions of $P_4$, such as in a spraying column, is also functional. After the contact, the gas stream then contains O, $O_3$, and phosphorus oxides, mainly in the form of $P_4O_{10}$, which is strongly hygroscopic and reacts with any water vapor present to form phosphoric acid mists. A mist absorber is equipped to remove the mists from the gas stream. After passing the mist absorber, the gas stream containing ozone is free from phosphorus-containing species and is used to destroy toxic chemicals.

Ozone produced with this oxidation arrangement is determined by iodometric titration method. The gas stream enters a packed column (FIG. 4) containing 100 ml of alkaline potassium iodide solution. The reaction of ozone with iodide that occurs is $$O_3 + 2KI + OH \longrightarrow I_2 + KOH + O_2$$

The free iodine produced in this reaction is measured by titration with sodium thiosulfate in the presence of starch in solution. The concentration of ozone that is produced by this technique depends on the parameters, such as the air flow rate, the oxygen concentration in the air, the $P_4$ concentration in the aqueous emulsion, the temperature of aqueous emulsion of $P_4$ and the design of the apparatus (including bubblers or spray towers, and mist collectors). The effect of some of these parameters on ozone production are discussed below.

EXAMPLE 6

Production of Pure Ozone and Phosphoric Acid (a) Phosphorus (2 g) in 100 ml of water is placed in a bubbler (see FIG. 4). An air flow at 200 ml/min is bubbled through the bubbler at 60° C. $H_3PO_4$, 0.044 mmole and 0.003 mmole of $H_3PO_3$ per liter of air are determined in a 200 ml of 0.1N sodium hydroxide solution, which is used as a mist absorber. The third column containing potassium iodide solution measures a concentration of 0.008 mmole of $O_3$ per liter of air.

(b) When this experiment is repeated under the same condition as 1(a), except that the third column is replaced with 200 ml of a 0.1N sodium hydroxide solution, 0.048 mmol of $H_3PO_4$ and 0.0029 mmole of $H_3PO_3$ per liter of air are detected in the first sodium hydroxide solution (as a mist absorber), and 0.00055 mmole of $H_3PO_4$ ($H_3PO_3$ is undetectable) per liter of air are observed in the second sodium hydroxide solution. The $O_3/H_3PO_4$ ratio in the air stream after the mist absorber is calculated as 14, which is too large for the $O_3$ produced to be accounted for by the oxidation of $P_4$ that could be suspected to slip through the mist absorber. At a location downstream from a mist absorber, the molar ratio of $O_3$ found to P consumed as measured by total phosphorus-containing species detected is about 0.16. This result implies that 1.5 mole of $P_4$ is consumed for each mole of $O_3$ produced under the experimental conditions employed.

(c) Another experiment is performed using the same conditions as those described above in 1(a) except with 200 ml of 40% $H_3PO_4$ solution in a mist absorber, the concentration of $O_3$ detected after the mist absorber is 0.030 mmole per liter of air, which is equivalent to a 0.12% by weight of $O_3$, as measured by a potassium iodide solution in the third column. The results of these experiments demonstrate that a new ozone generator without using the conventional electric discharge method is obtained, and that a gas stream containing ozone without contamination of phosphorus-containing species is also obtained.

EXAMPLE 7

Removal of Isophorone or a PCB

Isophorone and a PCB are tested separately with this experimental continuous process configuration. Two g. of $P_4$ is added to 150 ml of water in the bubbler (33 mm i.d. ×250 mm height), and is heated to about 50° C. Air at a flow rate of 110 ml/min is bubbled through this aqueous $P_4$ emulsion. The gas stream passes through a gas washing bottle (45 mm i.d. ×250 mm height) containing 100 ml of about 50% phosphoric acid aqueous solution. The phosphoric acid mists are absorbed more effectively in a phosphoric acid solution. This gas stream is then passed through a column of glass wool filter to ensure the removal of the mists. Subsequently, the gas stream containing ozone enters a packed glass column (30 mm i.d.×450 mm height) with 5 mm O.D.×3 mm I.D.×5 mm height of hollow cylindrical ceramic beads) containing 200 ppm of isophorone or 10 ppm of AROCHLOR ® 1221 (PCB) in 100 ml aqueous solution.

(a) The removal efficiency of isophorone is 96% in 135 min treatment. The major destruction product is formic acid. Trace amounts of oxalic acid in addition to an unidentified organic acid, probably with molecular weight larger than propionic acid, are detected by an ion chromatographic technique.

(b) The concentration of PCB is monitored by ultraviolet spectroscopy during the course of the treatment. The removal efficiency is 16% (0.5 hr), 55% (1 hr), 66% (1.5 hr), and 90% (2.5 hr). However, the chloride ion is not detected by ion chromatography. These results are expected to be identical to those from pure ozone destruction, which is unable to dissociate the C-Cl bond.

The aforementioned Examples demonstrate the capability of the yellow phosphorus ($P_4$) process to destroy toxic compounds in aqueous solution. In addition, this process is used to destroy chemicals in a gas stream. The following experimental procedure illustrates this point.

EXAMPLE 7

VOC Removal-Carbon Regeneration

VOC (volatile organic compounds) are often removed from water by air stripping and then absorbed onto activated carbon. The activated carbon is regenerated, and the absorbed organics are destroyed by high temperature treatment as it has often been done by techniques conventional in the art. An alternative method for the treatment of carbon saturated with organics has been developed. The absorbed organics are stripped off carbon by steam or hot air, and followed by contacting this stripped gas mixture with an aqueous emulsion of yellow phosphorus to destroy the VOC.

A group of experiments were performed to simulate this type of operation. Steam stripping of organics adsorbed on carbon to regenerate activated carbon are demonstrated by the investigators previously. Here, the use of the $P_4$ technique for subsequent treatment of organics is demonstrated.

A gas stream containing several hundred to several thousand ppm of VOC, up to 20% of oxygen, and the balance of the volume is nitrogen was bubbled through a glass column (45 mm diameter × 84 mm long) containing $P_4$ (0.1 to 6 g) and water (500 ml) thermostated at 45°–80° C. The flow rate of the gas mixture compositions downstream from the glass column was measured by gas chromatography to determine the destruction efficiency. The results (Table 1) show that the destruction of benzene and dichloroethylene was very efficient. More than 70% of these organics were destroyed in less than 6 min of contact time. It is expected that nearly complete destruction (100%) of these organics will occur with longer contact time and/or with increased $P_4$ concentration.

The destruction efficiency depends on parameters including: (1) the concentration of organics, (2) $O_2$ in gas stream, the concentration of $P_4$ in aqueous emulsion, (3) temperature of aqueous emulsion of $P_4$, (4) the contact time, and (5) the effectiveness of gas-liquid contact. Also, it is expected that the destruction efficiency will increase with ultraviolet (UV) radiation as UV dissociates $O_3$ to produce O ($^1$D) which can react with water to produce HO radicals. Both O ($^1$D) and HO are very active chemical species. O ($^1$D) reacts effectively with saturated halogenated compounds, including FREON ®s, carbon tetrachloride, and chloroform.

TABLE 1

YELLOW PHOSPHORUS DESTRUCTION OF ORGANIC COMPOUNDS (50° C.)

| Organic | $P_{in}$ ppm | $P_{out}$ ppm | $O_2$ % | Flow Rate ml/ min | Contact Time Liquid min | Contact Time Gas | Removal % Organic |
|---|---|---|---|---|---|---|---|
| Benzene | 570 | 154 | 20 | 210 | 2.5 | 3.4 | 73 |
| Benzene | 483 | 259 | 3.6 | 210 | 2.5 | 3.4 | 46 |
| Dicholoroethylene | 715 | 208 | 7.8 | 280 | 1.9 | 2.6 | 71 |
| Dicholoroethylene | 455 | 194 | 2.1 | 190 | 2.8 | 3.8 | 57 |
| Dichloroethylene | 1456 | 712 | 2.3 | 210 | 2.5 | 3.4 | 52 |
| Dichloroethylene | 2974 | 1564 | 7.1 | 140 | 3.5 | 5.4 | 47 |

The mechanism of destruction of toxic chemicals by $P_4$/oxygen treatment continues to be investigated. While not wanting to be bound by theory, the reaction of $P_4$ with $O_2$ is believed to proceed via branched-chain mechanism. Others have identified several elementary reactions involved in the chain, and have determined rate constants for some of the reactions. However, a complete list of the elementary reactions occurring is not yet available. It has been reported that a large amount of atomic O is detected in the reaction zone during the reaction of $P_4$ and $O_2$. Subsequent reaction of O with $O_2$ produces $O_3$, which has been widely used for oxidative destruction of toxic chemicals. The final oxidation product of $P_4$ is $P_4O_{10}$, which is hygroscopic and readily reacts with water to form phosphoric acid mists. Many intermediates, such as PO, $PO_2$ have been identified during the process of $P_4O_{10}$ formation. These intermediates are highly reactive and may participate in the reaction with toxic chemicals. Thus, $P_4$ treatment of toxic chemicals may proceed not only via the ozone destruction pathway, but also through additional pathways involving reactions of intermediate species with toxic chemicals. The latter pathways may be responsible for the destruction of toxic chemicals, such as saturated organic chlorides, that usually cannot be destroyed by a simple ozone oxidation method without the aid of ultraviolet radiation.

This new technique utilizing oxidation of $P_4$ by $O_2$ in moist air to induce the destruction of toxic chemicals is reported. The toxic chemicals to be destroyed can be organic, as well as inorganic compounds; regardless of whether they are in gas, liquid, or solid phase. Also, this technique can generate ozone, and, therefore, is applicable to areas other than water and air pollution control, such as wood pulp industry, when ozone treatment is needed or required for bleaching.

While only a few embodiments of the invention have been shown and described herein, it will become apparent to those skilled in the art that various modifications and changes can be made in the process using aqueous molten yellow phosphorus and air to produce ozone in situ (and/or phosphoric acid) to destroy or remove undesirable organic or inorganic chemicals without departing from the spirit and scope of the present invention. All such modifications and changes coming within the scope of the appended claims are intended to be carried out thereby.

We claim:

1. A process for reducing the concentrations of organic compounds, inorganic compounds of combinations thereof in a feed stream in the gas phase, which method comprises:

A. reacting air or oxygen with an aqueous emulsion of molten $P_4$ producing oxidizing gaseous reagent, itself comprising O, ozone, phosphoric acid, PO, or $PO_2$, and B. concurrently or subsequently reacting the gaseous product of step (A) with a mixture at least one organic compound selected from the group consisting of aliphatic hydrocarbons, aromatic hydrocarbons, unsaturated aliphatic hydrocarbons, unsaturated aromatic hydrocarbons, aliphatic halogen compounds, aromatic halogen compounds, polychlorinated biphenyls, polybrominated biphenyls, nitroaromatics, aliphatic amines, aromatic amines, aliphatic acids, aromatic acids, aliphatic alcohols, aromatic alcohols, cyclic ketones, linear ketones, aromatic ketones, nitro-aliphatics, nitro-aromatics, aliphatic chlorides, aromatic chlorides, aromatic N-heterocyclics, dialkyl sulfides, chlorinated benzodioxins, organophosphorus pesticides, azo dyes, FREON ®s, or combinations thereof, at least one inorganic compound selected from cyanide, hydroxylamine, nitrosoamine, dithionate, hydroxylamine disulfonate, amine trisulfonate, amine disulfonate, sulfamate, nitrosodisulfonate or mixtures thereof or combinations thereof, all in the gas phase for a time and at a temperature effective to reduce the concentration of at least one organic compound, the at least one inorganic compound or combinations thereof present in the gas;

C. removing the gas produced in step B now reduced in content of the at least one organic compound, the at least one inorganic compound or combinations thereof;

wherein the yellow phosphorus is present in between about 0.01 and 20% by weight of the water and the organic compound or inorganic compound to yellow phosphorus is present in between about 0.01 to 10% by weight;

wherein in each of step A and B, the reaction is performed in each at of a temperature between about 43° and 100° C.; and wherein the ozone produced in step A is reacted with the at least one organic compound, at least one inorganic compound or combinations thereof for between about 0.1 and 500 minutes in either a batch or a continuous flow reaction system.

2. The process of claim 1 wherein the temperature is between about 45° and 100° C.

3. The process of claim 1 wherein the temperature is between about 45° and 90° C., and
the concentration of the organic compound is reduced about 75% by weight or greater.

4. The process of claim 1 wherein the contact temperature is between about 45° and 100° C., and the concentration of the organic compound, the inorganic compounds or mixtures thereof is reduced about 75% by weight or greater.

5. The process of claim 1 wherein the yellow phosphorus is present in the aqueous solution between about 0.1 and 10% by weight.

6. The process of claim 1 wherein yellow phosphorus is present in between about 0.001 to 20% by weight of the water present.

7. The process of claim 1 wherein the organic compounds are volatile organic compounds (VOC).

8. The process of claim 7 wherein the volatile organic compounds are first collected on activated carbon, desorbed from the activated carbon using hot air or steam, and then contacted with the aqueous emulsion of yellow phosphorus.

9. The process of claim 1 wherein in step (B), the reaction occurs in a stirred reactor, a spray tower reactor, an agitating bubbling reactor, a packet bubbling reactor or combinations thereof.

10. The process of claim 1 wherein the reaction mixture, the gas space above the reaction mixture containing ozone or a combination thereof is simultaneously or subsequently exposed to ultraviolet light to further dissociate ozone and increase the efficiency of the destruction of the organic compound, the inorganic compound or combinations thereof.

11. The process of claim 1 wherein in step B, only organic compounds are present.

12. The process of claim 1 wherein in step B, only inorganic compounds are present.

13. A process for reducing the concentrations of organic compounds, inorganic compounds or combinations thereof in liquid form, which method comprises:
AA. contacting air or oxygen with an aqueous emulsion of molten $P_4$ producing a gaseous composition, itself comprising O, ozone, phosphoric acid, PO, or $PO_2$; and
BB. concurrently or sequentially reacting the gaseous product of step (AA) with an aqueous composition comprising at least one organic compound selected from the group consisting of aliphatic hydrocarbons, aromatic hydrocarbons, unsaturated aliphatic hydrocarbons, unsaturated aromatic hydrocarbons, aliphatic halogen compounds, aromatic halogen compounds, polychlorinated biphenyls, polybrominated biphenyls, nitroaromatics, aliphatic amines, aromatic amines, aliphatic acids, aromatic acids, aliphatic alcohols, aromatic alcohols, cyclic ketones, linear ketones, aromatic ketones, nitro-aliphatics, nitro-aromatics, aliphatic chlorides, aromatic chlorides, aromatic N-heterocyclics, dialkyl sulfides, chlorinated benzodioxins, organophosphorus pesticides, azo dyes, FREON ®s, and combinations thereof, at least one inorganic compound selected from the group consisting of cyanide, hydroxylamine, nitrosoamine, dithionate, hydroxylamine disulfonate, amine trisulfonate, amine disulfonate, sulfamate, nitrosodisulfonate and mixtures thereof, or mixtures thereof, all now in the liquid phase for a time and at a temperature effective to reduce the concentration of the organic or inorganic compound present in the liquid;
CC. removing the liquid produced in step BB now reduced in content of the organic compound, the inorganic compound or combinations thereof;
wherein the yellow phosphorus is present in between about 0.01 and 20% by weight of the water and the organic compound or inorganic compound to yellow phosphorus is present in between about 0.01 to 10% by weight;
wherein in each of step AA and BB the reaction temperature is independently between about 43° and 100° C.; and
wherein the ozone produced in step AA is reacted with the organic compound or inorganic compound for between about 0.1 and 500 minutes in either batch or a continuous flow contact system.

14. The process of claim 13 wherein the temperature is between about 45° and 100° C.

15. The process of claim 14 wherein inorganic compounds are selected from cyanide, hydroxylamine, nitrosoamine, dithionate, hydroxyl amine disulfonate, amine trisulfonate, amine disulfonate, sulfamate, nitrosodisulfonate or mixtures thereof.

16. The process of claim 13 wherein the temperature is between about 45° and 90° C., and
the concentration of the organic compound is reduced about 75% by weight or greater.

17. The process of claim 13 wherein the reaction temperature is between about 45° and 100° C., and the concentration of the at least one organic compound, the at least one inorganic compound or combinations thereof is reduced about 75% by weight or greater.

18. The process of claim 13 wherein the yellow phosphorus is present in the aqueous solution between about 0.1 and 10% by weight.

19. The process of claim 13 wherein yellow phosphorus is present in between about 0.001 to 20% by weight of the water present.

20. The process of claim 13 wherein the organic compounds are volatile organic compounds.

21. The process of claim 20 wherein the volatile organic compounds are first collected on activated carbon, desorbed from the activated carbon using hot air or steam, and then reacted with the aqueous emulsion of yellow phosphorus.

22. The process of claim 13 wherein in step (BB), the reaction occurs in a stirred reactor, a spray tower reactor, an agitating bubbling reactor, a packed bubbling reactor or combinations thereof.

23. The process of clai 22 wherein the reaction mixture, the gas space above the reaction mixture containing ozone or a combination thereof is simultaneously or sequentially exposed to ultraviolet light to further dissociate ozone and increase the efficiency of the destruction of the toxic chemicals.

24. The process of claim 13 wherein
in step BB, the aqueous feed composition is a pulp stream in the manufacture of paper products, and
in step CC liquid and pulp after reaction in step BB are reduced in content of organic compounds, inorganic compounds of combinations thereof and the pulp residue has been bleached by the process.

25. A process of obtaining ozone and phosphoric acid, each essentially free of organic compounds as contaminants, which process comprises:

a. reacting air, oxygen or a combination thereof with an aqueous emulsion of molten yellow phosphorus at between about 43° and 100° C. producing ozone and $P_2O_5$, wherein the $P_2O_5$ reacts with water to form phosphoric acid mist;

b. transferring the gas stream produced in step a comprising ozone and phosphoric acid mist, absorbing the phosphoric acid mist in water and collecting it thereby, producing one separate gas stream consisting stream of essentially of ozone and air components, and a second essentially pure phosphoric acid as a liquid essentially free of organic compounds.

26. The process of claim 25 wherein the process further includes steps to convert toxic organic or inorganic compounds to non-toxic products, which process comprises:

c. reacting the ozone gas stream with toxic organic or inorganic compounds of combinations thereof for a time effective to react with the toxic compounds, or precursor compounds which can be further reacted to produce essentially non-toxic chemical products.

27. The process of claim 26 wherein the ozone is subjected to ultraviolet radiation.

28. The process of claim 26 wherein the composition further includes catalysys selected from metal oxides, hydrogen peroxide or combination thereof.

* * * * *